(12) United States Patent
Sharma

(10) Patent No.: US 11,650,905 B2
(45) Date of Patent: May 16, 2023

(54) TESTING SOURCE CODE CHANGES

(71) Applicant: International Business Machines Corporation, Armonk, NY (US)

(72) Inventor: Babita Sharma, Mississauga (CA)

(73) Assignee: International Business Machines Corporation, Armonk, NY (US)

(*) Notice: Subject to any disclaimer, the term of this patent is extended or adjusted under 35 U.S.C. 154(b) by 657 days.

(21) Appl. No.: 16/561,065

(22) Filed: Sep. 5, 2019

(65) Prior Publication Data

US 2021/0073107 A1    Mar. 11, 2021

(51) Int. Cl.
G06F 11/36    (2006.01)
G06F 21/57    (2013.01)

(52) U.S. Cl.
CPC ........ G06F 11/3624 (2013.01); G06F 21/577 (2013.01); *G06F 2221/033* (2013.01)

(58) Field of Classification Search
CPC .............. G06F 11/3624; G06F 21/577; G06F 2221/033; G06F 8/658; G06F 21/57; G06F 11/3684; G06F 11/3688; G06F 11/3604
See application file for complete search history.

(56) References Cited

U.S. PATENT DOCUMENTS

| | | | |
|---|---|---|---|
| 7,434,213 B1 * | 10/2008 | Prakash | G06F 8/41 717/152 |
| 8,156,483 B2 | 4/2012 | Berg et al. | |
| 8,819,637 B2 | 8/2014 | Abadi et al. | |
| 9,443,086 B2 | 9/2016 | Shankar | |
| 9,934,385 B2 | 4/2018 | Chestna | |
| 10,409,995 B1 * | 9/2019 | Wasiq | H04L 9/08 |
| 10,430,319 B1 * | 10/2019 | Tokappa | G06F 11/3692 |
| 10,534,918 B1 * | 1/2020 | Davidi | G06F 21/577 |
| 2008/0072214 A1 * | 3/2008 | Peyton | G06F 21/577 717/133 |
| 2012/0054724 A1 | 3/2012 | Kalman et al. | |

(Continued)

OTHER PUBLICATIONS

Murthy, N., "Codiscope Secureassist™: The Developer's Security Assistant", 2016 IEEE Cybersecurity Development, Nov. 3-4, 2016, 1 page.

(Continued)

*Primary Examiner* — Meng Li
(74) *Attorney, Agent, or Firm* — Donald J. O'Brien

(57) ABSTRACT

Embodiments are disclosed for testing source code changes. The techniques include generating an incremental intermediate representation of a security vulnerability fix to repair an identified security vulnerability of a source code application. The techniques also include merging the incremental intermediate representation with a full intermediate representation of a previous version of the source code application. The techniques further include generating an impact graph based on the merged intermediate representation. Additionally, the techniques include performing a security vulnerability analysis on the security vulnerability fix based on the merged intermediate representation, the impact graph, and the identified security vulnerability. Further, the techniques include updating the security vulnerability analysis by removing one or more findings that are not related to the impact graph. Also, the techniques include generating a security assessment for the security vulnerability fix based on the updated security vulnerability analysis.

18 Claims, 16 Drawing Sheets

(56) References Cited

U.S. PATENT DOCUMENTS

| | | | |
|---|---|---|---|
| 2015/0067861 A1* | 3/2015 | Foley | H04L 63/1425 |
| | | | 726/24 |
| 2015/0332055 A1 | 11/2015 | Siman | |
| 2015/0363196 A1 | 12/2015 | Carback, III et al. | |
| 2016/0378993 A1* | 12/2016 | McGee | G06F 21/577 |
| | | | 726/25 |
| 2017/0206360 A1 | 7/2017 | Brucker et al. | |
| 2017/0255544 A1* | 9/2017 | Plate | G06F 21/577 |
| 2018/0060068 A1* | 3/2018 | Ferrara | G06F 8/65 |
| 2018/0137279 A1* | 5/2018 | Peyton, Jr. | G06F 21/577 |
| 2018/0285572 A1 | 10/2018 | Hanner et al. | |
| 2018/0293386 A1 | 10/2018 | Barouni Ebrahimi et al. | |
| 2019/0102560 A1* | 4/2019 | Zettel, II | G06F 11/3051 |
| 2020/0082094 A1* | 3/2020 | Mcallister | G06F 8/77 |
| 2020/0301820 A1* | 9/2020 | Mola | G06F 11/3632 |
| 2021/0073107 A1* | 3/2021 | Sharma | G06F 11/3688 |

OTHER PUBLICATIONS

Khan et al., "Predicting Bug Inducing Source Code Change Patterns", 2016 International Conference on Open Source Systems and Technologies (ICOSST), Dec. 15-17, 2016, pp. 29-35.

Bosu et al., "Identifying The Characteristics Of Vulnerable Code Changes: An Empirical Study", FSE'14, Nov. 16-22, 2014, 12 pages.

Tripp et al., "Andromeda: Accurate and Scalable Security Analysis of Web Applications", FASE 2013: Fundamental Approaches to Software Engineering, Abstract Only, 8 pages.

Merineau et al., "Scan Time Reduction in Application Security Scanning", U.S. Appl. No. 62/422,381, filed Nov. 15, 2016.

Mell et al., "The NIST Definition of Cloud Computing", Recommendations of the National Institute of Standards and Technology, Sep. 2011, 7 pages.

* cited by examiner

TESTING SOURCE CODE CHANGES

BACKGROUND

The present disclosure relates to code changes, and more specifically, to testing code changes.

A security bug can be an error in computer software that can be exploited to gain unauthorized access on a computer system. Different techniques, such as static analysis, dynamic scanning, penetration testing, and the like, can be used to find security bugs in the source code of computer applications. Accordingly, a software engineer can make changes to source code to attempt to fix security bugs found by such techniques. However, once the change is made, it can be useful to test whether the source code change fixes the security bug.

SUMMARY

Embodiments are disclosed for testing source code changes. The techniques include generating an incremental intermediate representation of a security vulnerability fix to repair an identified security vulnerability of a source code application. The techniques also include merging the incremental intermediate representation with a full intermediate representation of a previous version of the source code application. The techniques further include generating an impact graph based on the merged intermediate representation. Additionally, the techniques include performing a security vulnerability analysis on the security vulnerability fix based on the merged intermediate representation, the impact graph, and the identified security vulnerability. Further, the techniques include updating the security vulnerability analysis by removing one or more findings that are not related to the impact graph. Also, the techniques include generating a security assessment for the security vulnerability fix based on the updated security vulnerability analysis.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
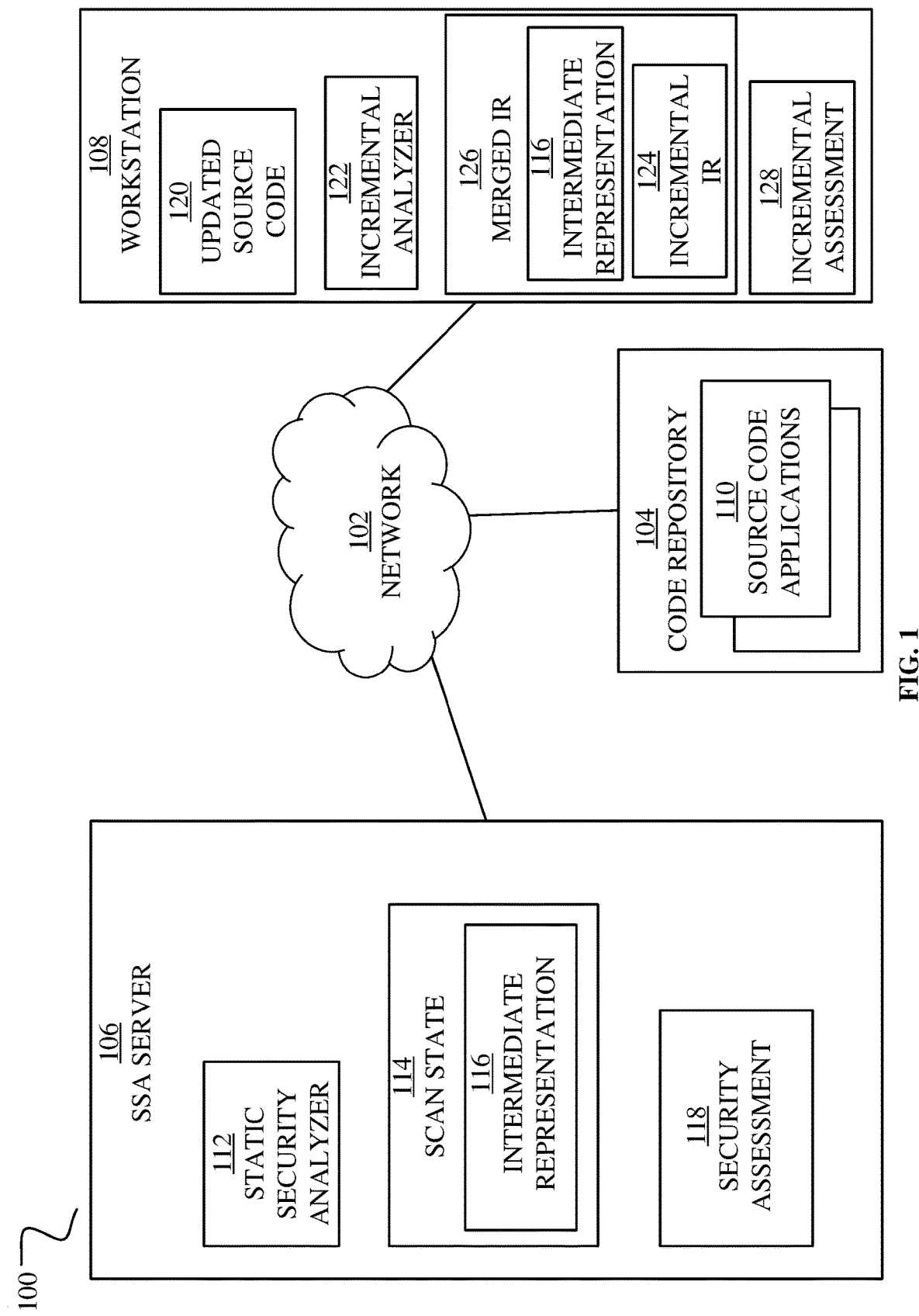
FIG. 1 is a block diagram of a system for testing source code changes, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

In static security analysis of source code, static security analysis can detect the entry of potentially tainted data into the computer application and the flow of this data through intermediate variable assignments, function calls, etc. More specifically, the static security analyzer can scan the source code and parse the source code into an intermediate representation. Accordingly, the intermediate representation can be analyzed to determine whether the source code has a security bug. For example, the static security analyzer can determine whether data originating from an external source (e.g., a web page) is passed through consecutive function calls until potentially tainted data ends up in a structured query language (SQL) query. Such a scenario can represent a security bug because it can be an avenue for an SQL injection attack. In an SQL injection attack, the security of the database is thwarted by tainted data infecting the database. Thus, if none of the intermediate function calls validate the data being passed, the application is vulnerable to the SQL injection attack.

However, when detecting an SQL injection attack or other security vulnerabilities, the static security analyzer can generate a trace. The trace can be a document indicating the path of the potentially tainted data through the various function calls of a computer application. The trace can begin at the source application programming interface (API), thus linking the intermediate method calls in the order they are invoked. Accordingly, the trace can end at the sink API. The sink API can represent the end destination of the potentially tainted data, e.g., the SQL query. In this way, a static security analyzer can enable a software engineer to locate security vulnerabilities in the source code of computer applications. Further, the information generated by the static security analyzer can be useful for the software engineer to determine an approach to fix security bugs.

However, testing to determine whether the code changes for the vulnerabilities reported by a static scan involve another full static security analysis scan to determine if the issue has been resolved or not. Thus, for large or complex applications, an additional scan can be time intensive. Further, code changes can introduce security defects and thus, it can be difficult to determine whether the specified security bug has been fixed. For example, the code change may fix the security bug for one of the data-flow paths but does not fix other data flow paths for the same security bug. It is also possible for the new code to alter some data-flows or introduce new data-flows in the program.

Accordingly, embodiments of the present disclosure can relatively quickly test if code changes have fixed a given security bug. In addition to determining whether the change fixes an identified bug, embodiments of the present disclosure can determine whether the source code change introduces security bugs.

Referring now to FIG. 1, which is a block diagram of a system 100 for testing source code changes, in accordance with some embodiments of the present disclosure. The system 100 includes a network 102, code repository 104, static security analyzer (SSA) server 106, and workstation 108. The network 102 can be one or more computer communication networks, including local area networks and wide-area networks, such as the Internet. The code repository 104, SSA server 106, and workstation 108 can be in communication over the network 102. The code repository 104, SSA server 106, and workstation 108 can be computing devices having one or more computer processors (not shown) and system memory. Such computing devices can include rack server devices, smartphones, tablets, laptops, and/or desktop computing devices.

The code repository 104 can provide a change control protocol for source code applications 110. The change control protocol can help enforce version controls to ensure the correct version of computer applications are implemented in the correct environments. Accordingly, a software engineer operating the workstation 108 can check source code applications 110 in and out of the code repository 104. In this way, no more than one user can make changes to a checked-out source code application.

The SSA server 106 includes an SSA 112, scan state 114, and security assessment 118. The SSA 112 can be configured to identify security bugs in a selected source code application 110. More specifically, the SSA 112 can perform a scan on the selected source code application 110 to generate a scan state 114, including an intermediate representation 116 of the selected source code application 110. The intermediate representation 116 can be useful for identifying security bugs. In some examples, the intermediate representation 116 can include a graph-like structure that can be used to perform flow analysis.

The SSA 112 can thus generate a security assessment 118 for the selected source code application 110. The security assessment 118 can include findings (not shown) that describe the various types of security bugs that the SSA 112 identifies. Herein, the term, findings can refer to multiple security bugs or vulnerabilities. Similarly, the term, finding, can refer to a single security bug or vulnerability. Additionally, the security assessment 118 can include traces for potentially tainted data to pass through a computer application. In some examples, the SSA 112 can be run on the workstation 108, or provided as a service, such as in a software as a service (SaaS) implementation.

According to embodiments of the present disclosure, a software engineer can operate the workstation 108. Accordingly, the workstation 108 can be used to check the selected source code application 110 out of the code repository 104. Further, the software engineer can generate updated source code 120 from the selected source code application 110 in order to fix one or more identified security bugs. To identify security bugs, the workstation 108 can include an incremental analyzer 122. The incremental analyzer 122 can also be useful for selecting security bugs identified in the security assessment 118 and performing an analysis on the updated source code 120 to determine whether the updated source code 120 fixes the selected security bug(s). Additionally, the incremental analyzer 122 can determine whether the updated source code 120 introduces new security bugs.

More specifically, the incremental analyzer 122 can identify the changes in the updated source code 120, i.e., the differences between the updated source code 120 and the checked-out version of the selected source code application 110. Further, the incremental analyzer 122 can generate an incremental intermediate representation (IR) 124 based on the identified changes. The incremental IR 124 can be generated for the purpose of static security analysis. Further, the incremental analyzer 122 can merge the incremental IR 124 with the original intermediate representation 116 to generate the merged IR 126.

Further, the incremental analyzer 122 can generate an impact call-graph based on the identified changes and the selected security bugs. The impact call-graph can be a tree-shaped graph that represents a call structure of functions within the updated source code 120. Accordingly, using the call impact graph, the incremental analyzer 122 can determine the called functions that can be impacted by the code change. Knowing the functions that are impacted by the code change can enable the incremental analyzer 122 to perform a static security analysis on the merged IR 126. In this way, the incremental analyzer 122 can generate an incremental assessment 128. The incremental assessment 128 indicates if the selected security bugs are fixed by the updated source code 120. Further, the incremental assessment 128 can include a list of new security bugs introduced by the identified changes. In this way, the incremental assessment 128 can identify potential regressions.

In some embodiments, the incremental analyzer 122 can be incorporated into an integrated development environment (IDE) (not shown) on the workstation 108. An IDE can be a collection of software tools that are useful for drafting, compiling, linking, testing, and executing source code applications 110 and updated source code 120. In some embodiments, the incremental analyzer 124 can be provided through an SaaS implementation.

The system 100 allows for the full or baseline scans to be run on a machine different from the developer's machine so that the individual developers can run incremental scans for their specific code updates. Further, using the incremental analyzer 122, a developer can relatively easily and quickly test fixes before delivering the updated source code 120 to the code repository 104 or other version control system.

Figure 2:
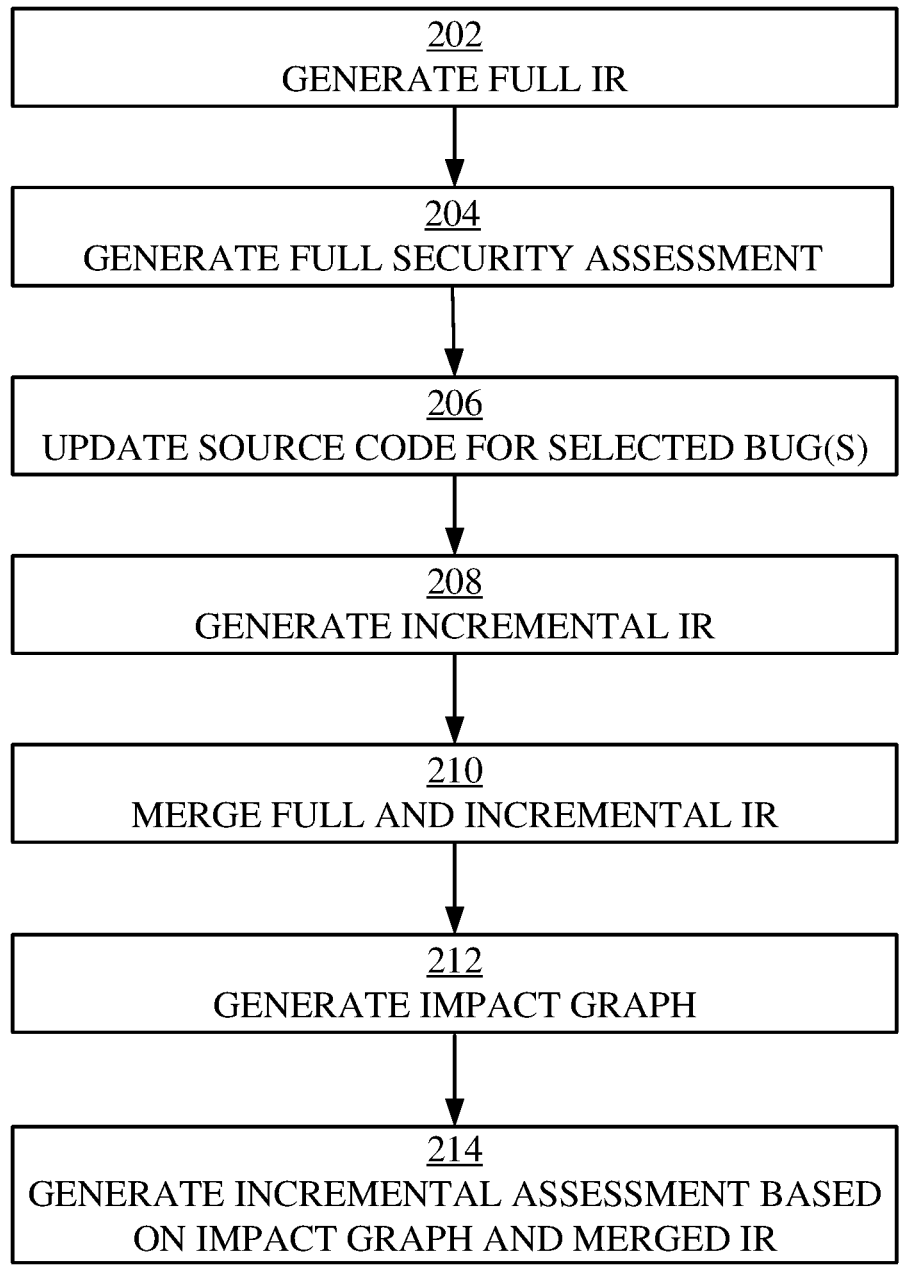
FIG. 2 is a flowchart of an example method for testing source code changes, in accordance with some embodiments of the present disclosure.

FIG. 2 is a flowchart of an example method 200 for testing source code changes, in accordance with some embodiments of the present disclosure. The SSA 112 and the incremental analyzer 122 can perform the method 200. Accordingly, at block 202, the SSA 112 can generate a full IR for a selected source code application 110. More specifically, the SSA 112 can perform a full scan on the selected source code application 110 and generate the resulting scan state 114, including the intermediate representation 116. The full scan involves parsing all source files and generating the intermediate representation 116 for all the source files and analyzing the routines in the whole selected source code application 110.

Additionally, at block 204, the SSA 112 can generate the associated security assessment 118 for the intermediate representation 116. The full scan can be run on the SSA server 106, as shown. Alternatively, the full scan can be run on the workstation 108 with a checked out version of the selected source code application 110. In some embodiments, the full scan can be run on the cloud in a SaaS environment. The intermediate representation 116 and the scan state 118 are updated after every full scan of the selected source code application 110.

At block 206, the software engineer can update the selected source code application 110 for a selected security bug. More specifically, the incremental analyzer 122 can be incorporated into an IDE on the workstation 108. Through this IDE, the incremental analyzer 122 can present the security assessment 118 on a display of the workstation 108. Further, the incremental analyzer 122 can enable the software engineer to select one or more security bugs identified in the security assessment 118 for fixing. In some embodiments, the security assessment 118 can include remediation advice and suggested fix locations in the source code. Additionally, the software engineer can check the selected source code application 110 out of the code repository 104. Further, the software engineer can generate the updated source code 120 by updating the selected source code application 110 to fix the selected security bug.

At block 208, incremental analyzer 122 can generate the incremental IR 124. Once the software engineer has completed the updated source code 120, the software engineer can direct the incremental analyzer 122 to run an incremental test of the code change. Accordingly, the incremental analyzer 122 can parse the changed files of the updated source code 120, find the routines that have changed in these files, and analyze the changed routines and their impact. More specifically, the incremental analyzer 122 can analyze the updated source code 120 to detect files that have been modified, files that have been newly added to the application, and files that have been deleted from the application since the previous full scan. Additionally, the incremental analyzer 122 can parse the changed files and generate a partial scan state, i.e., the incremental IR 124.

At block 210, the incremental analyzer 122 can merge the incremental IR 124 with the intermediate representation 116 from the last full scan to produce the merged IR 126. The merged IR 126 can represent an intermediate representation for the updated source code 120. The merged IR 126 thus represents the latest state of the complete application and has all the data-flows. Merging can also include detecting function or routine-level changes by comparing the program representations of functions (routines) in the incremental IR 124 with those in the intermediate representation 116. In this way, the incremental analyzer 122 can detect function or routine-level changes in the updated source code 120. The incremental analyzer 122 can thus generate a list of modified methods comprised of the detected functions or routines. Changes in the updated source code 120 can include added or deleted source files (for example, a java or a .class file). The changes can also include adding, modifying or deleting file-level, class-level or global variables. If the updated source code 120 is written in an object-oriented programming language, the changes can include extending an existing class. Function-level changes in the updated source code 120 can include, for example, adding a new function to a source file, modifying an existing function or deleting a function. In an object-oriented programming language, the changes can include adding a virtual function. Function modifications can include changing the signature of the function, adding or renaming its local or formal variables, adding, modifying or deleting instructions in the function.

Merging the intermediate representation 116 and the incremental IR 124 makes it possible to generate complete end-to-end data-flow trace of the computer application. The traces can include a path going from a function in the changed file to a function in an unchanged file and, thereafter, to a sink function. Thus, if the intermediate representation 116 and the incremental IR 124 are not merged, such a flow can be missed. Similarly, there may be a trace consisting of a path from an unchanged function to a changed function and then to a sink. The merge can ensure that such data-flows are included in the vulnerability analysis.

The security assessment 118 from the previous full scan can indicate the specific lines of code where potentially tainted data can be input to a malicious API call (sink node). Additionally, the security assessment 118 can include a full trace starting from the source method where potentially tainted data can enter the system 100, the intermediate method calls, and the method where potentially tainted data can be input to a malicious API (sink). Accordingly, the incremental analyzer can parse these findings in the security assessment 118 and add the source method and sink method to the list of modified methods. The incremental analyzer 122 can also save the vulnerability type of each finding and associated information. The term, vulnerability, as used herein, refers to a section of source code that, when executed, has the potential to allow external inputs to cause improper or undesired execution, such as an SQL injection attack. Adding the source and sink methods from a finding to the modified methods list can ensure that all data-flows related to this finding also get re-tested. Such data-flows may be for the same or a different vulnerability type.

At block 212, the incremental analyzer 122 can determine the roots of an impacted call-graph. The impact graph can include all the changed functions or routines and additional functions that can be affected by the changed functions, e.g., the modified methods list. More specifically, the incremental analyzer 122 can determine a set of disjointed call-graphs in the call-graph for the entire updated source code 120. This set of disjointed call-graphs can be determined such that there is no call involving data going from one disjointed call-graph to another. Rather, each of these disjointed call-graphs can have a distinct root node and be identified by this root-node. The incremental analyzer can thus identify the call-graphs that contain the changed functions and run an iterative taint-flow analysis only on these identified call-graphs to determine the impact call-graph.

At block 214, the incremental analyzer 122 can generate the incremental assessment 128 based on the impact call-graph and the merged IR 126. Generating the incremental assessment 128 can include performing an analysis for vulnerabilities in the functions and/or routines in the impact call-graph and generating findings similar to the findings described with respect to the security assessment 118. The analysis is described in greater detail with respect to FIGS. 3-15.

Further, when the incremental analyzer 122 generates a trace for an identified security bug, the incremental analyzer 122 can update the findings generated by the security vulnerability analysis. More specifically, the incremental analyzer 122 can determine whether the trace includes methods from the modified methods list. Determining whether the trace includes methods from the modified methods list can indicate if a specific finding is related to the methods impacted by the source code change. If the trace does not include one of the modified methods, the incremental analyzer 122 can delete the finding and associated trace such that the unrelated finding is not included in the incremental assessment 128. This can be done because the impact call-graph may not be precise. Rather, the impact call-graph can be determined coarsely, which means that the impact call-graph can include methods that are not actually impacted by the code changes. However, while less accurate than a precise impact call-graph, use of the coarse impact call-graph can be faster than a precise determination. While the resulting analysis with this impact call-graph can produce unrelated findings, the incremental analyzer 122 can remove unrelated findings faster than the incremental analyzer can determine a more precise impact call-graph. In this way, the incremental assessment 128 can be limited to security bugs that are caused by the code changes in the updated source code 120. Additionally, the incremental analyzer 122 can iterate through the resultant findings produced by analysis, and using the selection bugs, generate the incremental assessment 128 to include 3 lists: 1) A list of fixed findings; If the user-selected finding is not present in the resultant findings, it goes in this list; 2) A list of findings with same source-sink and same vulnerability type as the selected security bug; Entries in this list can mean that the security bug still exists and the code change does not fully fix it; 3) All other vulnerabilities caused by the changes. These are regressions caused by the changes in the updated source.

Figure 3:
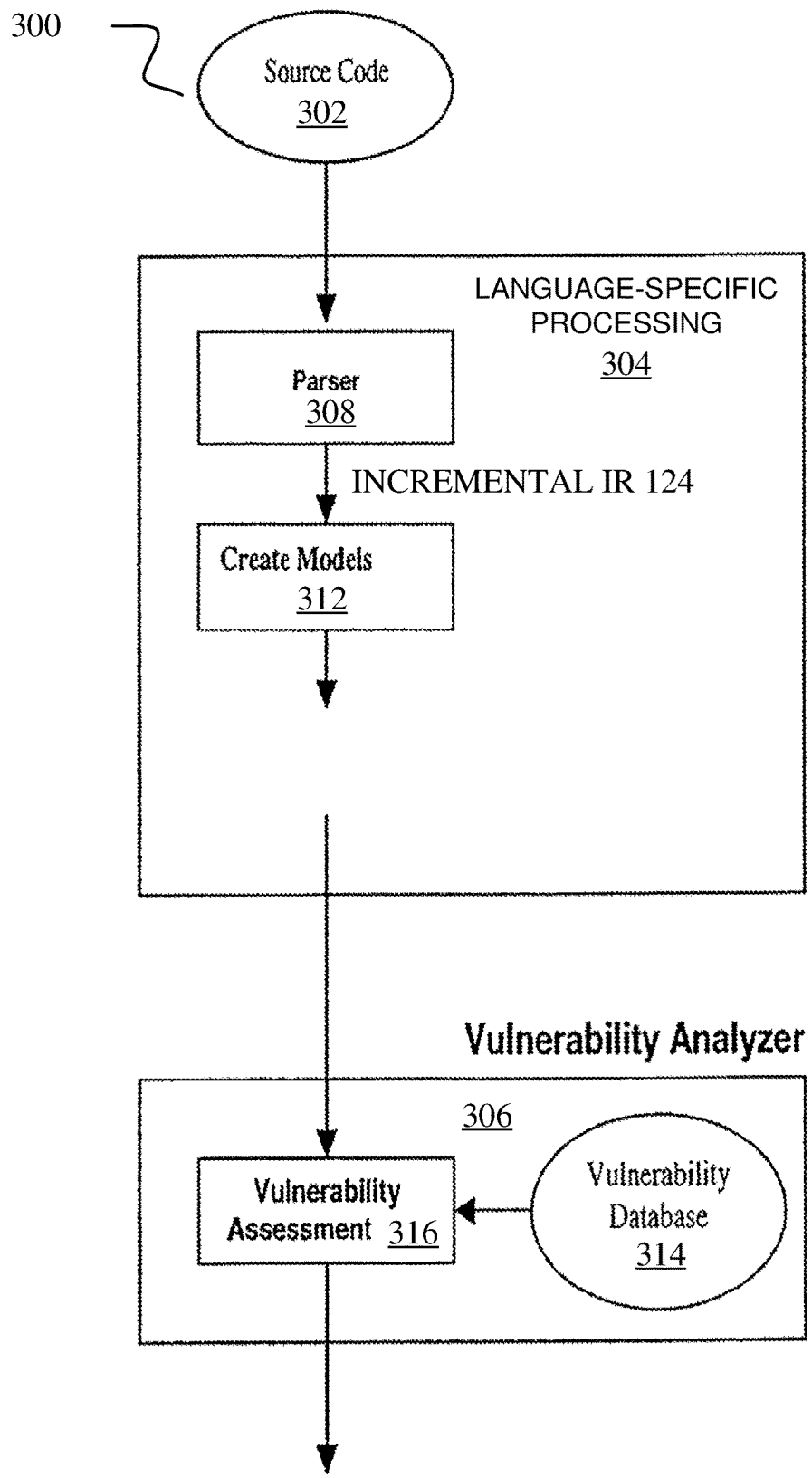
FIG. 3 is a data flow diagram of a method for detecting vulnerabilities in source code, in accordance with some embodiments of the present disclosure.

FIG. 3 is a data flow diagram of a method 300 for detecting vulnerabilities in source code, in accordance with some embodiments of the present disclosure. Herein, the terms, vulnerability and security vulnerability, can refer to specific findings, such as described with respect to FIGS. 1-2. Vulnerabilities can include, for example, buffer overflow, race condition and privilege escalation. In the method 300, the incremental analyzer 122 can input source code 302 to language-specific processing 304. The source code 302 can include the source code from the functions and/or routines identified in the impact call-graph.

The method 300 includes two processes: language-specific processing 304 and a vulnerability analyzer 306. The language specific processing 304 can analyze the source code 302 to create models. More specifically, the language specific processing 304 begins with a language parser 308 that creates the incremental IR 124. The incremental IR 124 can be input to the create models process 312. The models can be created to describe certain characteristics of the source code 302. Further, the models can be used in conjunction with a vulnerability database 314 in a vulnerability assessment process 316 to determine whether the source code 302 includes a vulnerability. The vulnerability database 314 can include, for example, library call sites that are known to have potential vulnerabilities.

Figure 4:
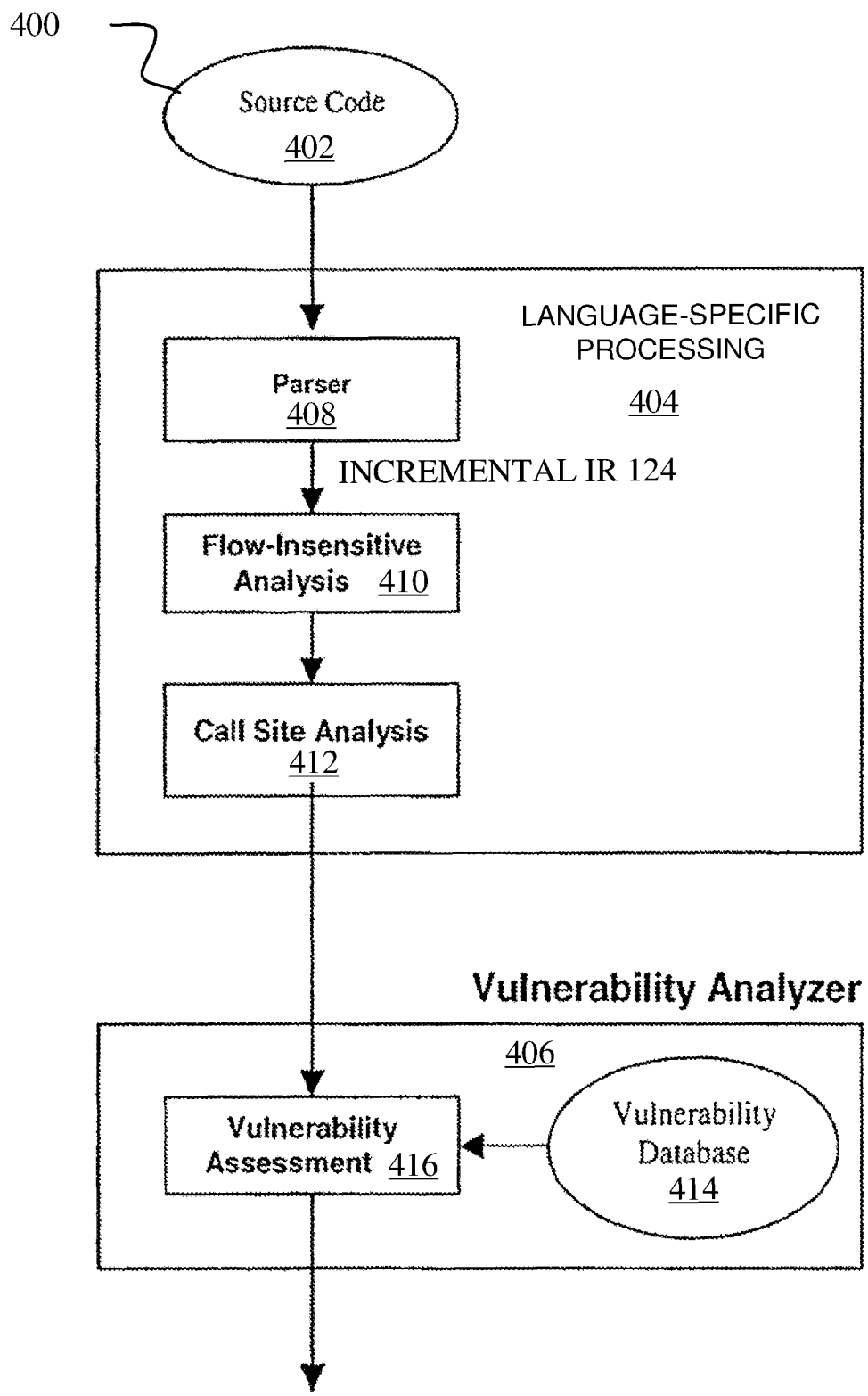
FIG. 4 is a data flow diagram of a method for detecting vulnerabilities in source code, in accordance with some embodiments of the present disclosure.

FIG. 4 is a data flow diagram of a method 400 for detecting vulnerabilities in source code, in accordance with some embodiments of the present disclosure. In the method 400, the incremental analyzer 122 can input source code 402 to language-specific processing 404. The method 400 includes two processes: language-specific processing 404 and a vulnerability analyzer 406. The language specific processing 404 analyzes the source code 402 and models the arguments used to call select procedures, functions or routines. The models can be represented with a structure called a vulnerability lattice. The vulnerability lattice is used to specify, certain relevant information about the argument (whether a variable or expression) such as its memory size, its memory type, etc. This lattice representation can be language independent. The vulnerability database 414 and the vulnerability assessment process 416 are similar to the vulnerability database 314 and the vulnerability assessment process 316 described with respect to FIG. 3.

The vulnerability analyzer 406 can use the vulnerability lattices and other information to analyze the effects of such routine calls with such arguments. This analysis can be language independent. The analysis applies rules to determine whether a given routine call in the source code 402, including the arguments used in such call, pose an inherent vulnerability or risk for certain types of errors. For example, the analysis may determine that a certain routine call with certain arguments at a given location in the source code creates a potential for a buffer overflow error.

The language-specific processing 404 can begin with a language parser 408 to receive the source code 402 to be analyzed and to generate the incremental IR 124. Further, the language-specific processing 404 can include flow-insensitive analysis 410 to analyze the incremental IR 124 and derive models about each variable in the code. These models are specified in lattice form and called vulnerability lattices, or expression lattices. The models can represent various states and/or parameters of a computer application. Thus, when analyzing the flow in a mock execution of the computer application, these various states and/or parameters can be determined using vulnerability lattices.

A vulnerability lattice can include a number of other lattices to describe characteristics of a variable or expression (depending on whether the vulnerability lattice is associated with a variable or expression). More specifically, the vulnerability lattices provide information about memory size, data size, whether data is null terminated, the kind of memory contained in a block of memory, the constant string value or values for a block of memory, and the origin of data.

Thus, when determining how a lattice should be set or modified, the flow-insensitive analysis 410 can apply predetermined merger rules for the various lattice types. This can be useful, for example, when analyzing expressions. The flow-insensitive analysis 410 can also use integral lattices to describe integral type variables.

Both the language-specific processing 404 and the vulnerability analyzer 406 can use lattice structures to model and analyze the variables and expressions that may be used as arguments to routines. By way of background, a lattice represents a refinement of knowledge about the value of an entity.

Figure 5:
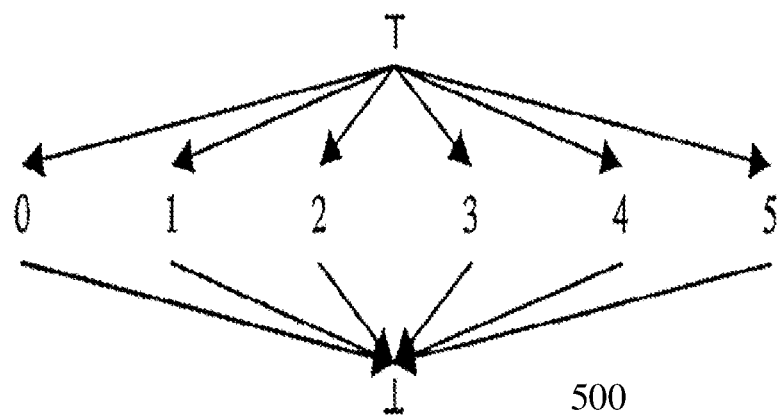
FIG. 5 is an example of an integral lattice, in accordance with some embodiments of the present disclosure.

FIG. 5 shows an example of an integral lattice 500 for an integer value, in accordance with some embodiments of the present disclosure. The top value, "T," at the top of the integral lattice 500 can represent no knowledge of the integer value. Further, the value, "⊥," at the bottom of the integral lattice 500 can represent an unknown value. In other words, there is no resolution about which of the possible integer values are to be applied. The values between the top value and the bottom value represent the possible values of the entity. Thus, in the integral lattice 500, the integers 0, 1, 2, 3, 4 and 5 are the possible values for the entity.

Figure 6:
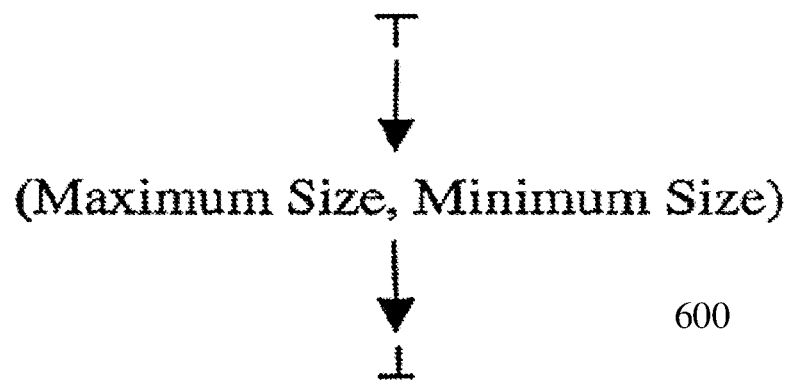
FIG. 6 is an example of a memory size lattice, in accordance with some embodiments of the present disclosure.

FIG. 6 depicts an example of a memory size lattice 600, in accordance with some embodiments of the present disclosure. The memory size lattice 600 is a lattice consisting of the values high, low, and a pair of non-negative integral values, indicating the possible range of sizes of a block of memory, either directly or referenced via a pointer. The memory size lattice 600 can be used to determine if certain memory operations specified in the source code 302, 402 can overflow the available memory. The merge rules for the memory size lattice 600 are as follows: a merge of a high value, "T," and any other value can result in the other value; a merge of a low value, "⊥," and any other value can result in a low value; and a merge of two memory range lattice values will result in the following: range maximum←$range_1$ maximum [$range_2$ maximum([is the maximum of operator), and, range minimum←$range_1$ minimum [$range_2$ minimum ([is the minimum of operator).

For example, an array declared in c or c++ as, char a[100]; can have a size of 100 bytes, that being the size of 1 byte per entry multiplied by one hundred elements in the array. As another example, a memory size lattice representing a range of size values could be useful for the following CODE SEGMENT 1:

---
CODE SEGMENT 1
---
char a[100];
char b[200];
char *c=(i==0) ? a:b;
---

The size of the block of memory pointed to by the variable c in CODE SEGMENT 1 could be either 100 bytes or 200 bytes, depending on whether the array a or the array b is selected. Additionally, the size of the block of memory can depend on whether the value of the variable i is equal to zero. As such, a memory size lattice result for the variable, c, can specify a maximum size of 200 and a minimum of 100 bytes.

Figure 7:
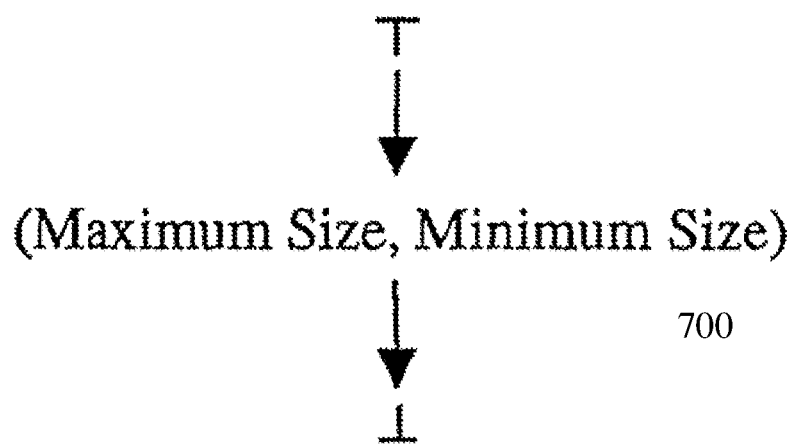
FIG. 7 is an example of a data size lattice, in accordance with some embodiments of the present disclosure.

FIG. 7 depicts an example of a data size lattice 700, in accordance with some embodiments of the invention. The data size lattice 700 indicates the possible range of sizes of the known data within a block of memory, either directly or referenced via a pointer. The data size lattice 700 can be used to determine if certain memory operations overflow the available memory. Additionally, the data size lattice 700 can be useful to determine the size of a null terminated string, which may be shorter than the block of memory in which it is contained. Accordingly, the merge rules for the data size lattice 700 are as follows: a merge of a high value, "T," and any other value results in the other value; a merge of a low value, "⊥," and any other value results in the low value; and a merge of two memory range lattice values result in the following: range maximum←$range_1$ maximum [$range_2$ maximum, and, range minimum←$range_1$ minimum [$range_2$ minimum.

Figure 8:
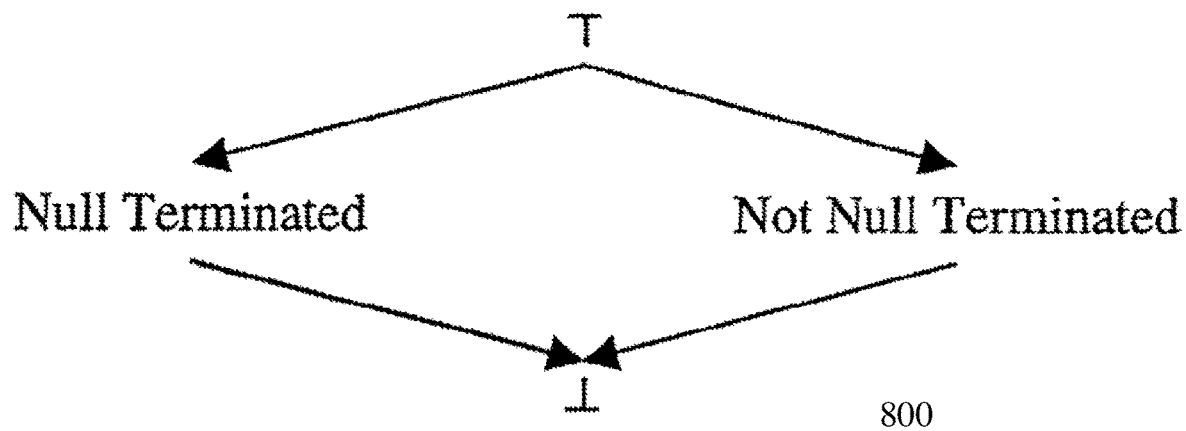
FIG. 8 is an example of a null terminated lattice, in accordance with some embodiments of the present disclosure.

FIG. 8 depicts an example of a null terminated lattice 800, in accordance with some embodiments of the present disclosure. The null terminated lattice 800 can indicate whether or not the data is known to be null terminated, e.g., has a 0 value as the last entry to indicate the end of the data. Null-terminated data can be used in connection with string structures. The range of data includes specifying that the data is either null terminated or not null terminated.

The merge rules for the null terminated lattice 800 are as follows: a merge of a high value, "T," and any other value will result in the other value; a merge of a low value, "⊥," and any other value will result in a low value; a merge of two identical non-high, non-low lattice values will result in the same lattice value; and a merge of two different non-high, non-low lattice values will result in the low value, "⊥."

Figure 9:
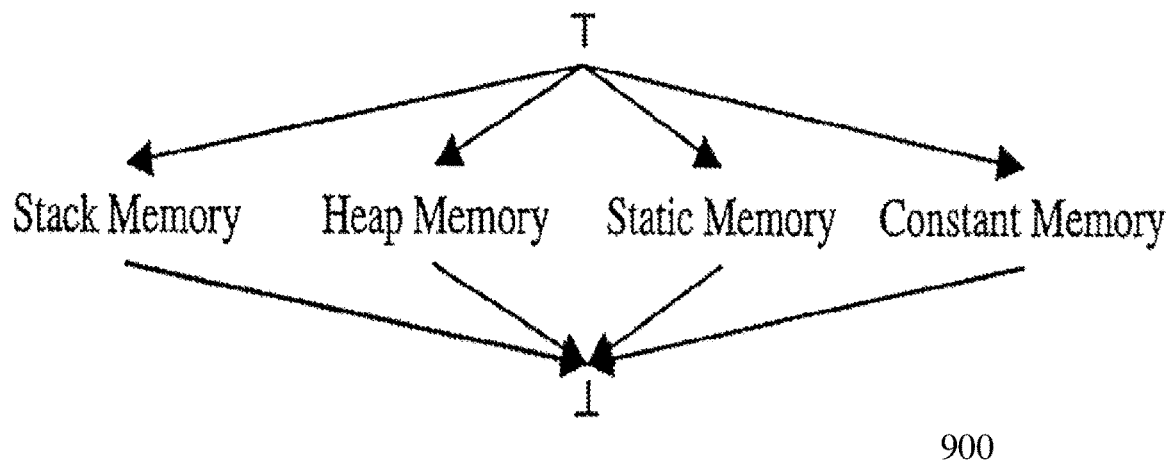
FIG. 9 is an example of a memory location lattice, in accordance with some embodiments of the present disclosure.

FIG. 9 depicts an example of a memory location lattice 900, in accordance with some embodiments of the present disclosure. The memory location lattice 900 can represent the kind of memory that the block of memory is contained within, e.g., stack memory, heap memory, static memory, and constant memory. Other kinds of memory may also be specified.

The merge rules for the memory location lattice 900 are as follows: a merge of a high value, "T," and any other value will result in the other value; a merge of a low value, "⊥," and any other value will result in the low value; a merge of two identical non-high, non-low lattice values will result in the same lattice value; and a merge of two different non-high, non-low lattice values will result in the low lattice value, "⊥."

Figure 10:
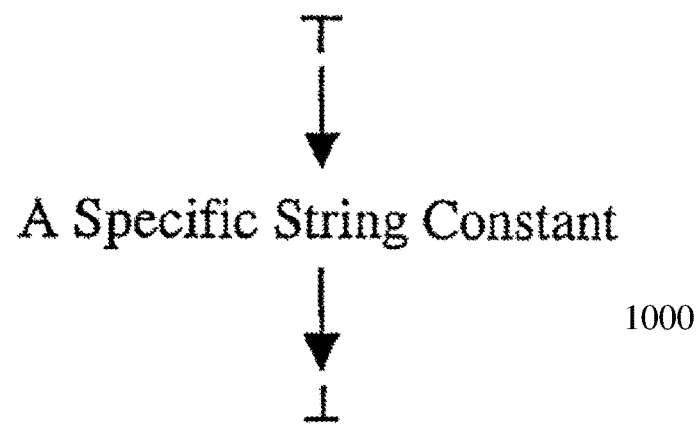
FIG. 10 is an example of a string value lattice, in accordance with some embodiments of the present disclosure.

FIG. 10 depicts an example of a string value lattice 1000, in accordance with some embodiments of the present disclosure. The string value lattice 1000 can represent the constant string value or values for the block of memory.

The merge rules for a string value lattice are as follows: a merge of a high value, "T," and any other value will result in the other value; a merge of a low value, "⊥," and any other value will result in a low value; a merge of two identical constant strings will result in that constant string as the lattice value; and a merge of two different constant strings will result in the low lattice value, "⊥."

Figure 11:
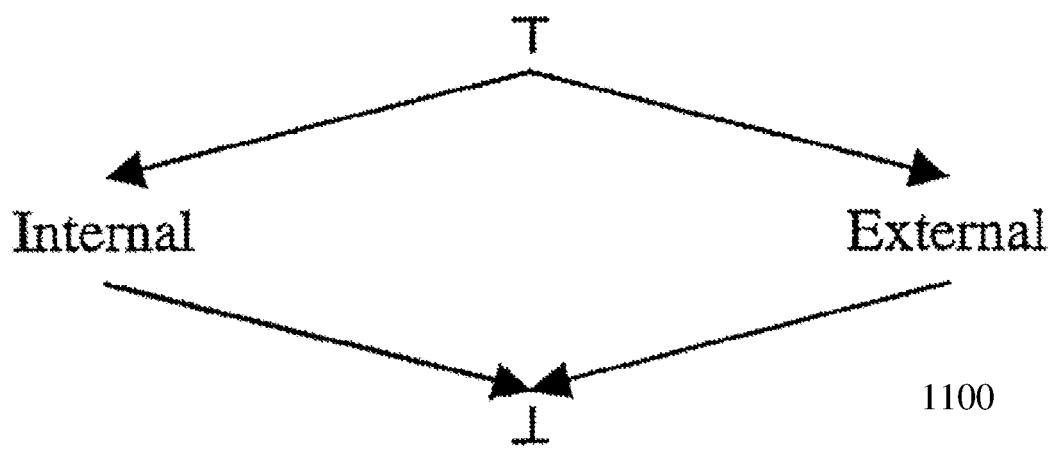
FIG. 11 is an example of a data origin lattice, in accordance with some embodiments of the present disclosure.

FIG. 11 depicts an example of a data origin lattice 1100, in accordance with some embodiments of the present disclosure. The data origin lattice 1100 can represent the origin of the data, e.g., specifying that the data is internally generated (relative to the analyzed routine) or whether the data is externally generated. Data of an unknown origin can have the low value.

The merge rules for a data origin lattice are as follows: a merge of a high value, "T," and any other value will result in the other value; a merge of a low value, "⊥," and any other value will result in a low value; a merge of two identical non-high, non-low lattice values will result in the same lattice value; and a merge of two different non-high, non-low lattice values will result in the low lattice value, "⊥."

A vulnerability lattice can represent the attributes of a non-integral type variables (or expressions). In some embodiments, the vulnerability lattice can incorporate the memory size lattice 600, data size lattice 700, null terminated lattice 800, memory location lattice 900, string value lattice 1000, and data origin lattice 1100.

Figure 12:
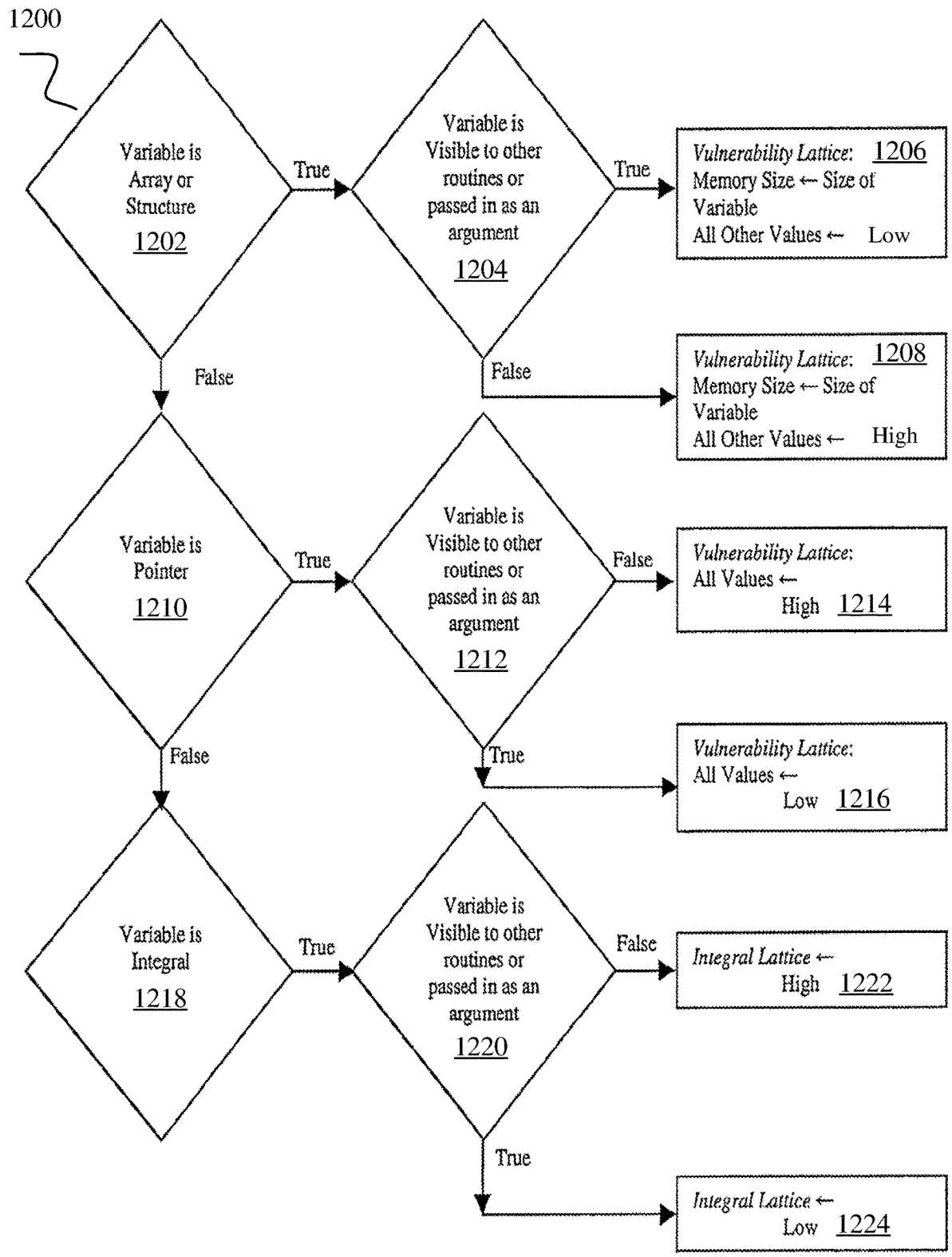
FIG. 12 is a flowchart of a method for flow-insensitive analysis, in accordance with some embodiments of the present disclosure.

FIG. 12 is a flow chart of a method 1200 for flow-insensitive analysis, in accordance with some embodiments of the present disclosure. Flow-insensitive analysis, such as the flow-insensitive analysis 410 can derive a vulnerability lattice for each non-integral type variable or expression and an integral lattice for each integral type variable or expression in the source code 402. The term, lattice, as used herein, can refer to a vulnerability lattice in the case of a non-integral variable, or the term can refer to an expression or an integral lattice in the case of an integral type variable or expression.

At block 1202, the incremental analyzer 122 can determine if the variable being analyzed is an array or structure. If so, the control flows to block 1204.

At block 1204, the incremental analyzer 122 can determine if the variable is visible to other routines or passed into other routines as an argument. If the variable is visible to other routines or passed into other routines as an argument, the control flows to block 1206.

At block 1206, the incremental analyzer can generate a vulnerability lattice. The vulnerability lattice can include a memory size lattice having a value set to the size of the variable being passed into the argument. The incremental analyzer 122 can set all other values of the vulnerability lattice to low. If the variable being passed is a constant initialized variable, a data size lattice, null terminated lattice, and string value lattice can be set to indicate the initialized value of the variable.

If the variable is not visible to other routines or not passed into other routines as an argument, control flows to block 1208. At block 1208, the memory size lattice is set to a value the size of the variable. All other values in the vulnerability lattice are set to high.

If, at block 1202, it is determined that the variable is not an array or structure, control flows to block 1210. At block 1210, a test can be performed to determine whether the variable being analyzed is a pointer. If so, control flows to block 1212.

At block 1212, it is determine whether the pointer variable is visible to other routines, or if it is passed into other routines as an argument. If the variable is visible to other routines or passed into other routines as an argument, control flows to block 1214.

At block 1214, the pointer variable is associated with a vulnerability lattice. Additionally, all values of the vulnerability lattice are set to low.

If the variable is not visible to other routines or not passed into other routines as an argument, control flows to block 1216. At block 1216, the pointer variable is associated with a vulnerability lattice. Additionally, all values of the vulnerability lattice are set to high.

If at block 1210, it is determined that the variable is not a pointer, control flows to block 1218. At block 1218, a test can be performed to determine whether the variable being analyzed is an integral type variable. Integral type variables are associated with an integral lattice.

Thus, if the variable is an integral type, control flows to block 1220. At block 1220, it can be determined if the integral variable is visible to other routines, or if it is passed in to other routines as an argument. If not, control flows to block 1222. At block 1222, the variable is associated with an integral lattice with all values set to high.

If the variable is visible to other routines or not passed into other routines as an argument, control flows to block 1224. At block 1224, the variable is associated with an integral lattice with all values set to low.

In this way, the method 1200 for flow-insensitive analysis can generate a vulnerability lattice or integral lattice for each variable in the code 402. Additionally, flow-insensitive analysis involves visiting each statement in the code 402. Visiting involves analyzing the statement before processing. The visits may be made in any order. Each expression within a statement is visited in such an order that before the expression is processed, all the expressions given as input (i.e., dependencies) to that expression are processed.

For example, in the expression, a=(b+c)+d; the partial, or sub-expressions b and c are processed before the expression (b+c) is processed. Similarly, the sub-expressions (b+c) and d are processed before the expression (b+c)+d is processed.

Figure 13A:
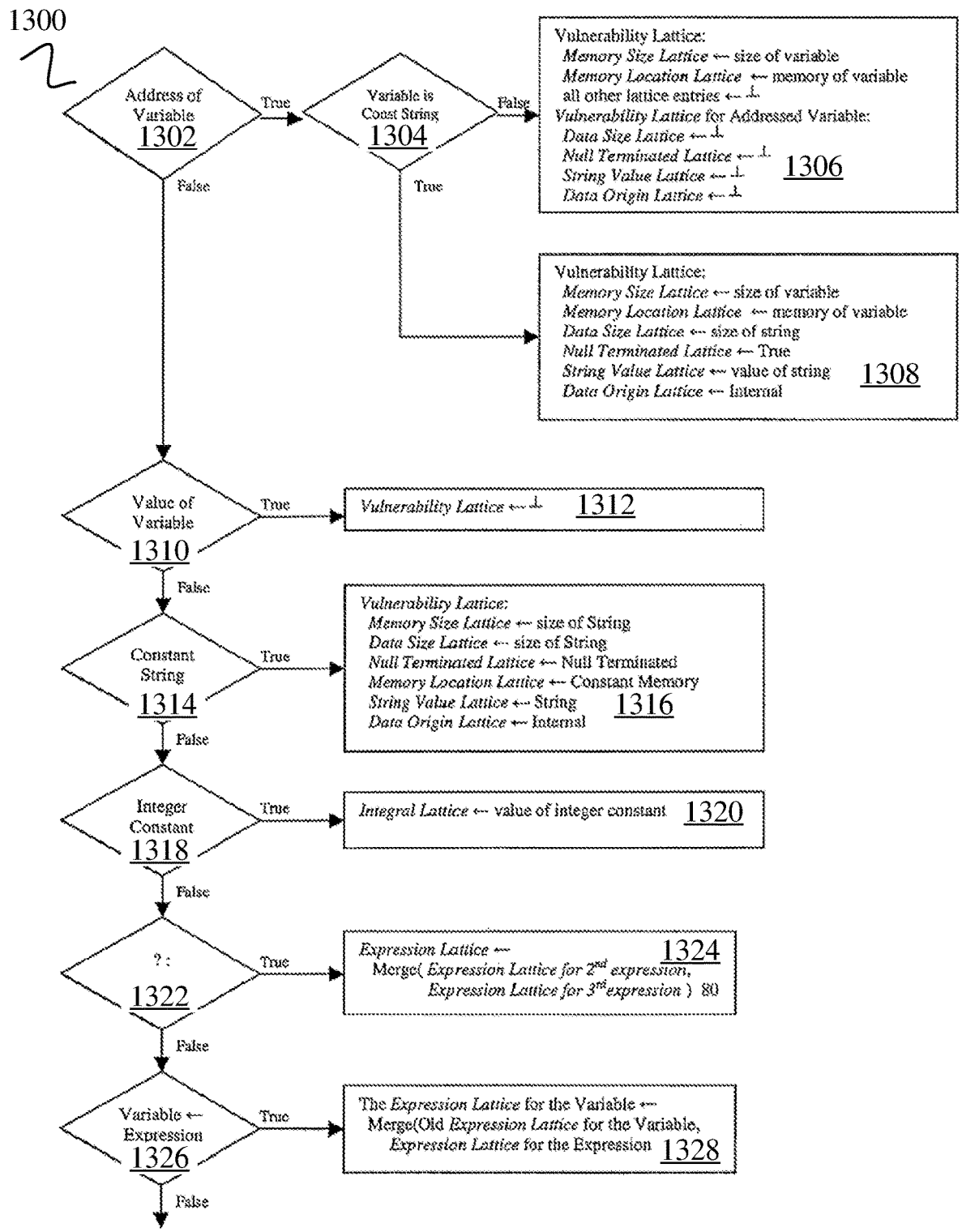
FIGS. 13A-B are flowcharts of a method for processing expressions according to the flow-insensitive analysis, in accordance with some embodiments of the present disclosure.
Figure 13B:
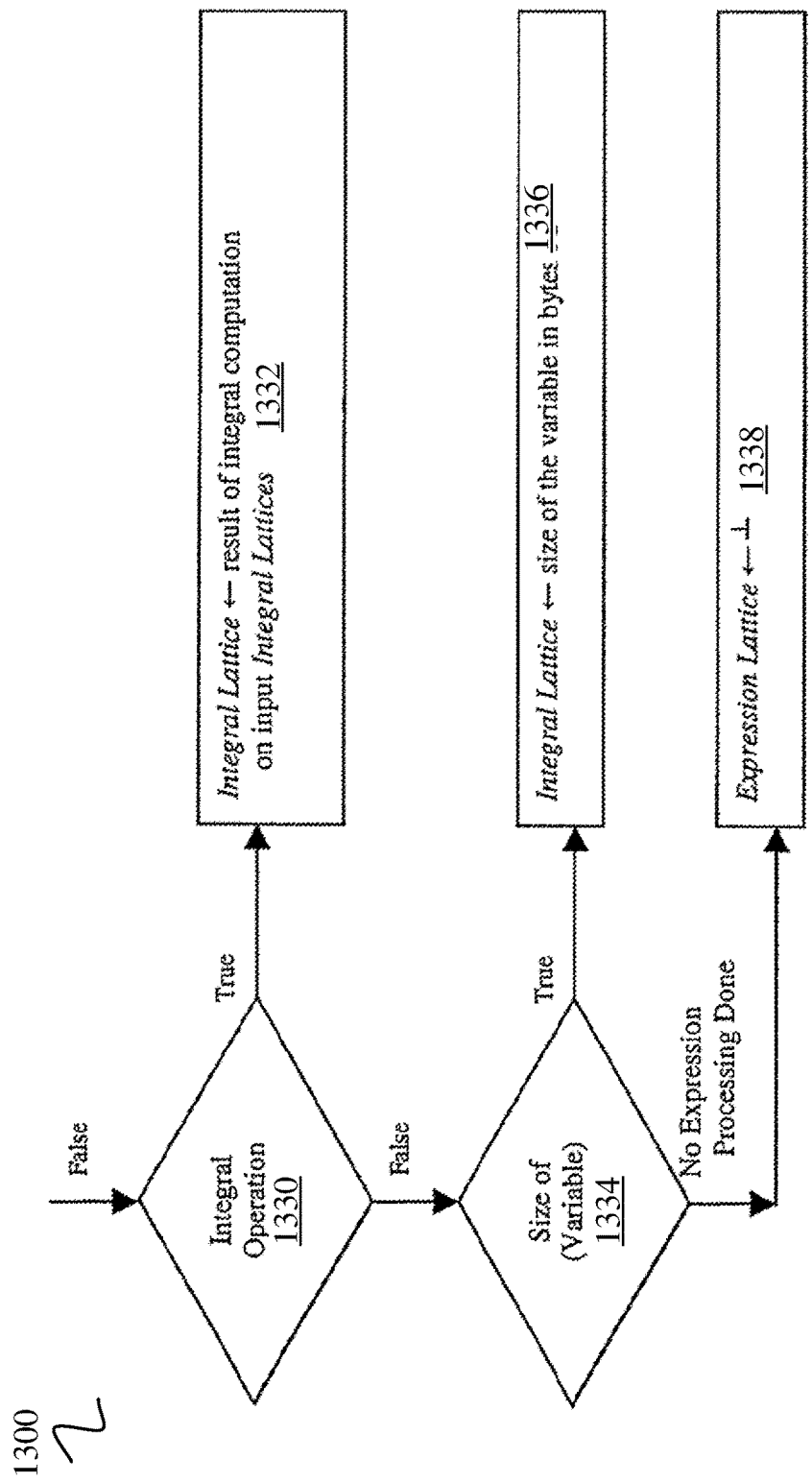

FIGS. 13A-B are flow charts of a method 1300 for flow-insensitive analysis, in accordance with embodiments of the present disclosure. At block 1302, it can be determine if the expression being analyzed is for an address of a variable. If so, the variable can be an array, a structure, or a constant string. Accordingly, control flows to block 1304.

At block 1304, a test can be made to determine if the variable is to a constant string. If not, control flows to block 1308.

At block 1308, a vulnerability lattice is associated with the expression. Additionally, the memory size lattice is set to the size of the variable, and the memory location lattice is set to the kind of memory of the variable referenced. Further, the data size lattice is set to the size of the string and the null terminated lattice is set to null terminated. The string value lattice is also set to the value of the string. Additionally, the data origin lattice is set to specify that the data origin is internal.

If at block 1304, it is determined the variable is not a constant string, control flows to block 1306. At block 1306, a vulnerability lattice is associated with that expression and its memory size lattice is set to the size of the variable. Additionally, its memory location lattice is set to the kind of memory of the variable referenced. The other lattice entries are set to the low value.

In addition, since the variable is address exposed (i.e., a pointer to it exists and it can potentially be modified by any pointer write to the pointer), at block 1306, the vulnerability lattice whose address was taken has its data size lattice, null terminated lattice, string value lattice, and data origin lattice set to low (with the memory size lattice and memory location lattice remaining unchanged).

If at block 1302, it is determined that the expression is not referring to the address of a variable, control flows to block 1310. At block 1310, a test is made to determine if the expression is for a value of a variable. If so, control flows to block 1312.

At block 1312, a vulnerability lattice is associated with the expression. Additionally, all lattice entries are set to low.

If at block 1310, it is determined that the expression is not referring to the address or value of a variable, control can flow to block 1314. At block 1314, a test is made to determine if the expression is for a constant string. If so, control flows to block 1316.

At block 1316, a vulnerability lattice is associated with the expression and its memory size lattice is set to the size of the constant string, including a null termination byte. Additionally, its data size lattice is set to the size of the constant string, including the null termination byte. Further, its null termination lattice is set to indicate that it is null terminated. Its memory location lattice is also set to indicate constant memory. Additionally, its string value lattice is set to the contents of the string and its data origin lattice is set to internal.

If at block 1314, it is determined that the expression does not refer to a constant string, control flows to block 1318. At block 1318, a test is made to determine if the expression is for an integral constant (i.e., an integer). If so, control flows to block 1320.

At block 1320, an integral lattice is associated with the expression. Additionally, the value of the integral lattice is set to the integer value.

If, at block 1318, it is determined that the expression is not referring to an integral constant, control flows to block 1322. At block 1322, a test is made to determine if the expression is a question mark/colon operation. A question mark/colon operation is of the form <expression$_1$>?<expression$_2$>:<expression$_3$>. If so, control flows to block 1324.

At block 1324, a vulnerability lattice is associated with the expression. Additionally, its lattice entries are set to the results from merging the vulnerability lattices of <expression$_2$> and <expression$_3$> (which have been set previously).

If, at block 1322, it is determined that the expression is not a question mark/colon operation, control flows to block 1326. At block 1326, a test is made to determine if the expression is an assignment operation, i.e., assigning the expression to a variable. If so, control flows to block 1328.

At block 1328, the expression lattice for the target variable (i.e., the one being assigned) is updated. Specifically, the prior values of the expression lattice are merged with the expression lattice for the expression being assigned to the target variable.

If, at block 1326, the result is false, control flows to block 1330 of FIG. 13B.

At block 1330, a test is made to determine if the expression is for an integral operation. If so, control flows to block 1332. At block 1332, the integral value lattices for each input of the operation are used to compute a resulting integral lattice and value for the expression.

If, at block 1330, it is determined that the expression is not an integral operation, control flows to block 1334. At block 1334, a test is made to determine if the expression is for a size of operation. In other words, is the expression in the form: size of (<variable or type>). If so, control flows to block 1336.

At block 1336, an integral lattice is associated with the expression. Additionally, its value is the size of the variable (or type).

If, at block 1334, it is determined that the expression is for a size of operation, control flows to block 1338. At block 1338, a default assignment can be made in which all values of the expression lattice are set to low.

The following are examples of code segments that can be analyzed using flow-insensitive analysis to determine, for example, whether a buffer flow vulnerability exists. Each of the following examples is followed by a description of how flow-insensitive analysis models the variables and expressions with the various lattices mentioned above.

---

CODE SEGMENT 2

```
void test1(int i) {
    char buf[100];
    char *p;
    switch (i) {
    case 1:
        p = "1";
        break;
    case 2:
        p = "12";
        break;
    default:
        p = "123";
        break;
    }
```

---

-continued

CODE SEGMENT 2

```
    strcpy(buf, p);
}
void test1(int i) {
```

---

An integral lattice for the variable i is created because its declared of "int" type and its integral lattice values are set to low: i←⊥.

---

CODE SEGMENT 2, LINE 2 char buf[100];

---

A vulnerability lattice is associated with the variable "buf." Further, because buf is an array, the memory size lattice is set to the size of the structure: buf←100. Since this variable is local and not visible to other routines or passed as an argument, all other lattices are set high: ←T, such as in block 1208 described with respect to FIG. 12.

---

CODE SEGMENT 2, LINE 3 char *p;

---

A vulnerability lattice is associated with the variable p. Because p is a pointer and thus not visible to other routines or passed as an argument, all lattices are set high: ←T, such as in block 1214 described with respect to FIG. 12.

---

CODE SEGMENT 2, LINE 3 switch (i) {.

---

The integral lattice for "i" has the value, ⊥, see above.

---

CODE SEGMENT 2, LINES 5-6.

case 1
    p="1";

---

This is an assignment operation and thus according to block 1328 described with respect to FIG. 13A. Consequently, the expression lattice for the variable being assigned can be the merge results of the prior value of the lattice for the variable (in this case high) and the expression lattice for the expression being assigned to the variable, in this case the expression, "1." The expression, "1," has the lattice shown in EXAMPLE LATTICE 1:

---

EXAMPLE LATTICE 1 memory size lattice←2
data size lattice←2
null terminated lattice←null terminated
memory location lattice←constant memory
data origin lattice←internal
string value lattice←"1"

The results of the merger rules are used for the vulnerability lattice for p and result in EXAMPLE LATTICE 2:

| EXAMPLE LATTICE 2 |
| --- |
| memory size lattice←2<br>data size lattice←2<br>null terminated lattice←null terminated<br>memory location lattice←constant memory<br>data origin lattice←internal<br>string value lattice←"1"<br>    break;<br>case 2:<br>    p="12"; |

This too is an assignment operation and thus can be processed according to block 1328 described with respect to FIG. 13A. Consequently, the expression lattice for the variable being assigned can be the merge results of the prior value of the lattice for the variable (see above) and the expression lattice for the expression being assigned to the variable, in this case the expression "12."

The expression "12" has EXAMPLE LATTICE 3:

| EXAMPLE LATTICE 3 |
| --- |
| memory size lattice←3<br>data size lattice←3<br>null terminated lattice←null terminated<br>memory location lattice←constant memory<br>data origin lattice←internal<br>string value lattice←"12" |

The results of the merger rules are used for the vulnerability lattice for p and can result in EXAMPLE LATTICE 4:

| EXAMPLE LATTICE 4 |
| --- |
| memory size lattice←range of 2 to 3<br>data size lattice←range of 2 to 3<br>null terminated lattice←null terminated<br>memory location lattice←constant memory<br>data origin lattice←internal<br>string value lattice← ⊥.<br>    break;<br>    default:<br>    p="123"; |

This too is an assignment operation and thus can be processed according to block 1328 described with respect to FIG. 13A. Consequently, the expression lattice for the variable being assigned can be the merge results of the prior value of the lattice for the variable (see above) and the expression lattice for the expression being assigned to the variable, in this case the expression "123." The expression "123" thus has EXAMPLE LATTICE 5:

| EXAMPLE LATTICE 5 |
| --- |
| memory size lattice←4<br>data size lattice←4<br>null terminated lattice←null terminated<br>memory location lattice←constant memory<br>data origin lattice←internal<br>string value lattice←"123" |

The results of the merger rules are used for the vulnerability lattice for p and result in EXAMPLE LATTICE 6:

| EXAMPLE LATTICE 6 |
| --- |
| memory size lattice←range of 2 to 4<br>data size lattice←range of 2 to 4<br>null terminated lattice←null terminated<br>memory location lattice←constant memory<br>data origin lattice←internal<br>string value lattice←⊥<br>    break;<br>}<br>strcpy(buf, p); |

Since the address of buf is implicitly taken for the argument, the vulnerability lattice can be processed according to block 1306 described with respect to FIG. 13A. Accordingly, the vulnerability lattice for buf is modified to set the data size lattice, memory size lattice, string value lattice and data origin lattice to unknown.

Since the expression p refers to the value of a variable, the vulnerability lattice can be processed according to block 1312 described with respect to FIG. 13A. Accordingly, all values in the vulnerability lattice of the expression p are set to unknown.

| CODE SEGMENT 3 |
| --- |
| static char y[100];<br>void test2(char *z) {<br>    strcpy(y, z);<br>}<br>static char y[100]; |

A vulnerability lattice is associated with array y. The memory size of the array is set to 100, its memory kind lattice is set to static, and all other lattices are set low: ←⊥. This is done because the variable y is visible to other routines, as described with respect to block 1206 in FIG. 12.

| CODE SEGMENT 3, LINE 2 |
| --- |
| void test2(char *z) {. |

A vulnerability lattice is associated with pointer variable z. All lattices are set low: ←⊥. This is done because the variable z is passed to other routines as an argument, as described with respect to block 1216 in FIG. 12.

| CODE SEGMENT 3, LINE 3 |
| --- |
| strcpy(y, z); |

Since the address of y is implicitly taken for the argument, the vulnerability lattice is processed as described with respect to block 1306 in FIG. 13A. Accordingly, the vulnerability lattice for y is modified to set the data size lattice, memory size lattice, string value lattice and data origin lattice to unknown. Since the expression z refers to the value of a variable, the vulnerability lattice can be processed as described with respect to block 1312 in FIG. 13A. Accordingly, all values in the vulnerability lattice of the expression z are set to unknown.

As described with respect to FIG. 4, in addition to the flow-insensitive analysis, a call site analysis can be performed. The call site analysis can generate vulnerability lattices for each variable or expression argument passed at a call site within the routine being analyzed. A call site is the location within the code where a call is made to a routine. The arguments may be variables or expressions. In some embodiments, the call site analysis is limited to calls to predetermined routines, procedures, or functions. This approach can be efficient because not all routines pose a vulnerability risk. However, all the call sites can be visited in the call site analysis, although not in any specific order. In call site analysis, each argument of the call can be analyzed such that any subexpression dependencies are processed first. In other words, before an expression making up an argument is processed, all the subexpressions given as input to that expression are processed.

Unlike the flow-insensitive analysis, in the call site analysis, any expression referring to the value of a variable, associates the vulnerability lattice for that variable with the expression making such reference. In addition, any assignment operation to a variable does not change the vulnerability lattice for that variable.

Figure 14A:
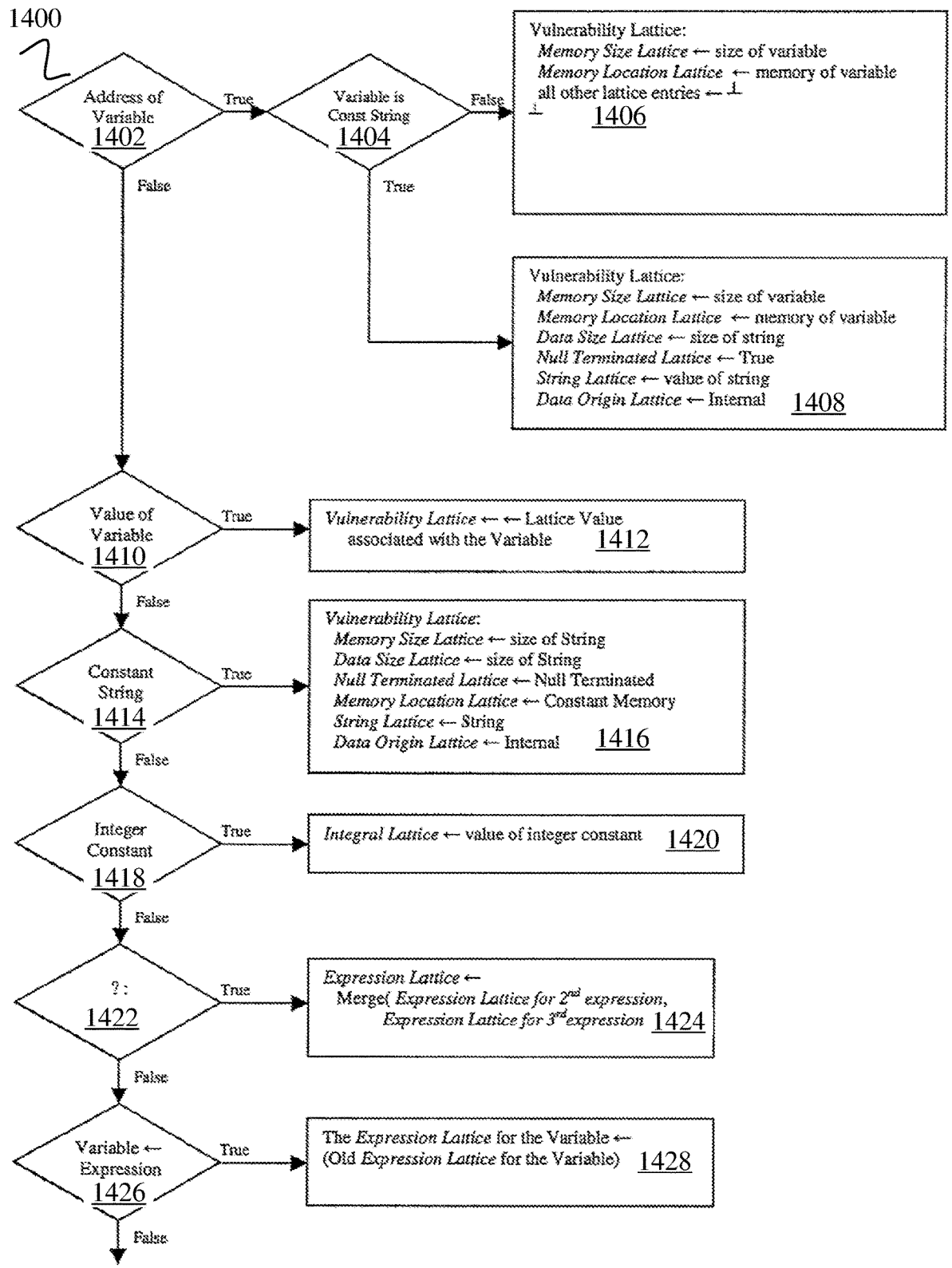
FIGS. 14A-B are flowcharts of a method for processing expressions according to the call site analysis, in accordance with some embodiments of the present disclosure.
Figure 14B:
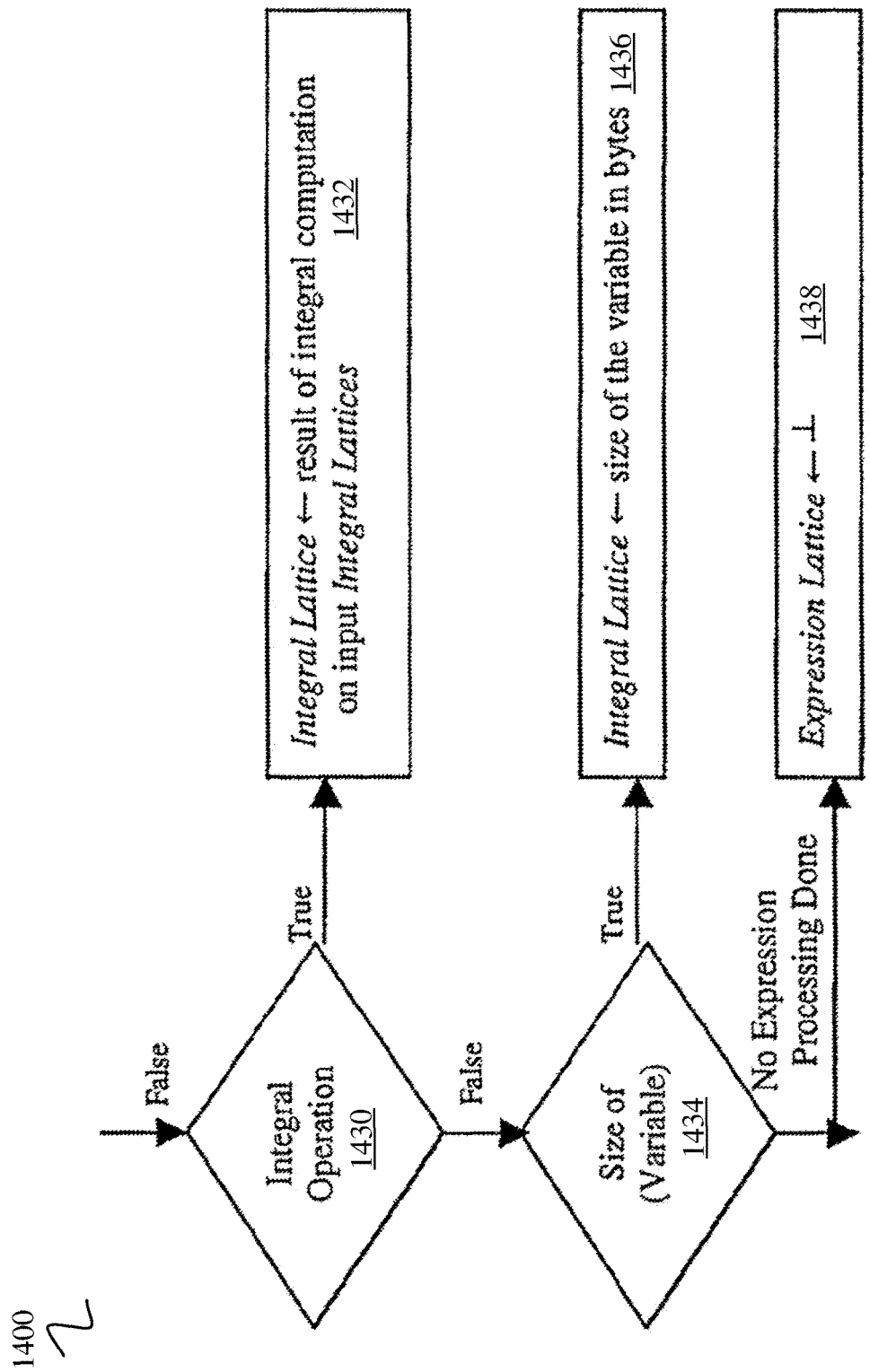

FIGS. 14A-B are flow charts of a method for call site analysis, in accordance with embodiments of the present disclosure. At block 1402, it may be determined if the expression being analyzed is for an address of a variable. If so, control flows to block 1404.

At block 1404, a test is made to determine if that variable is to an array or structure or to determine if the variable is a constant string. If so, control flows to block 1408.

At block 1408, a vulnerability lattice is associated with that expression. Additionally, the memory size lattice is set to the size of the variable, and its memory location lattice is set to the kind of memory of the variable referenced. If the variable has a constant (const) attribute and it is a string, the data size lattice is set to the size of the string and the null terminated lattice is set to null terminated. The string value lattice is set to the value of the string. The data origin lattice is set to specify that the data origin is internal.

If the variable is not a constant string, control flows to block 1406. At block 1406, a vulnerability lattice is associated with that expression. The memory size lattice is set to the size of the variable, and its memory location lattice is set to the kind of memory of the variable referenced. The other lattice entries are set to the low value.

If, at block 1402, it is determined that the expression is not being analyzed for the address of a variable, control flows to block 1410. At block 1410, a test is made to determine if the expression is for a value of a variable. If so, control flows to block 1412.

At block 1412, a vulnerability lattice is associated with the expression. All lattice entries are set to lattice values associated with the variable.

If at block 1410, it is determined the expression is not for a value of a variable, control flows to block 1414. At block 1414, a test is made to determine if the expression is for a constant string. If so, control flows to block 1416.

At block 1416, a vulnerability lattice is associated with the expression. The memory size lattice is set to the size of the constant string, including null termination byte. The data size lattice is set to the size of the constant string, including the null termination byte. The null termination lattice is set to indicate that it is null terminated. The memory location lattice is set to indicate constant memory. The string value lattice is set to the contents of the string. Additionally, the data origin lattice is set to internal.

If at block 1414, it is determined the expression is not for a constant string, control flows to block 1418. At block 1418, a test is made to determine if the expression is for an integral constant (i.e., an integer). If so, control flows to block 1420.

At block 1420, an integral lattice is associated with the expression. The value is set to the integer value.

If at block 1418, it is determined the expression is not for an integer, control flows to block 1422. At block 1422, a test is made to determine if the expression is a question mark/colon operation. If so, control flows to block 1424.

At block 1424, a vulnerability lattice is associated with the expression. The lattice entries are set to the results from merging the vulnerability lattices of <expression$_2$> and <expression$_3$> (which have been set previously).

If at block 1422, it is determined the expression is not for a question mark/colon operation, control flows to block 1426. At block 1426, a test is made to determine if the expression is an assignment operation, i.e., assigning the expression to a variable. If so, control flows to block 1428. At block 1428, the expression lattice for the target variable (i.e., the one being assigned) remains the same as the prior expression lattice for the variable.

If at block 1426, it is determined the expression is not an assignment operation, control flows to block 1430 in FIG. 13B. At block 1430, a test is made to determine if the expression is for an integral operation. If so, control flows to block 1432. At block 1432, the integral value lattices for each input of the operation are used to compute a resulting integral lattice and value for the expression.

If at block 1430, it is determined the expression is not for an integral operation, control flows to block 1434. At block 1434, a test is made to determine if the expression is for a size of operation. If so, control flows to block 1436. At block 1436, an integral lattice is associated with the expression and its value will be the size of the variable (or type). If not, control flows to block 1438. At block 1438, a default assignment is made in which all values of the expression lattice are set to low.

Referring back to the exemplary code segments analyzed in connection with the flow-insensitive analysis logic, the following processing takes place in CODE SEGMENT 1. The call to strcpy has its arguments analyzed for lattice values. Argument 1 has the value buf, which has the vulnerability lattice shown in EXAMPLE LATTICE 7:

---
EXAMPLE LATTICE 7 memory size lattice←100
data size lattice← ⊥
null terminated lattice← ⊥
string value lattice← ⊥
memory location lattice←stack memory
data origin lattice← ⊥

---

Argument 2 has the value p, which has the vulnerability lattice shown in EXAMPLE LATTICE 8:

---
EXAMPLE LATTICE 8 memory size lattice←range of 2 to 4
data size lattice←range of 2 to 4
null terminated lattice←null terminated
string value lattice← ⊥
memory location lattice←constant memory
data origin lattice←internal
}

---

With respect to CODE SEGMENT 3, the call to strcpy has its arguments analyzed for lattice values. Argument 1 has the value y, which has the vulnerability lattice shown in EXAMPLE LATTICE 9:

| EXAMPLE LATTICE 9 |
|---|
| memory size lattice←100<br>data size lattice← ⊥<br>null terminated lattice← ⊥<br>string value lattice← ⊥<br>memory location lattice←static memory<br>data origin lattice← ⊥ |

Argument 2 has the value z, which has vulnerability lattice values shown in EXAMPLE LATTICE 10:

| EXAMPLE LATTICE 10 |
|---|
| memory size lattice← ⊥<br>data size lattice← ⊥<br>null terminated lattice← ⊥<br>string value lattice← ⊥<br>memory location lattice← ⊥<br>data origin lattice← ⊥<br>} |

According to some embodiments, the vulnerability lattices are created for those arguments to library call sites that are known to have potential vulnerabilities, such as those identified in a vulnerability database 314, 414. Once the vulnerability lattices are created for the arguments to select routine calls, the source code is further analyzed in a language independent manner to determine if the source code has vulnerabilities for reporting. The vulnerability database 314, 414 can contain information about a number of pre-identified routines. Additionally, the vulnerability database 314, 414, can specify the conditions that can cause a vulnerability. The conditions can be specified as constraints to a vulnerability lattice for arguments passed to the routine.

Referring back to FIGS. 3-4, which reference the vulnerability assessment processes 316, 416. The vulnerability assessment processes 316 can operate as follows. Each call site in the source code 302, 402, as analyzed by call site analysis, is examined, though not in any specific order. The name of the called routine, and possibly information about its argument types, is used to create a routine lookup name. This routine lookup name is used as a key in the vulnerability database 314, 414 to discover if this call site is potentially vulnerable. If the lookup fails to discover a corresponding entry, then the call site is determined to be not vulnerable, because the routine name has no known vulnerabilities specified in the database 314, 414.

If the lookup discovers a corresponding entry, then the entry is examined for a list of matching actions, which are rules used to assess a specific call. Those matching actions are supplied in a specific order. Each matching action is compared to the vulnerability lattice for each argument to determine if the vulnerability lattice from the argument matches the requirement of the matching action. As illustrated in the example described below, if a match occurs, then the action reports a vulnerability for the examined call site. The report may then be used by a developer to address the potential vulnerability. Multiple vulnerabilities may be detected for a specific call site.

Referring back to the exemplary code segments analyzed in connection with the language specific processing logic, the following processing takes place in the vulnerability assessment process 316, 416.

Referring back to CODE SEGMENT 1, which had the following language-specific code: strcpy(buf, p). The call site analysis for this call can yield the following vulnerability lattice for the first argument buf shown in EXAMPLE LATTICE 11:

| EXAMPLE LATTICE 11 |
|---|
| memory size lattice←100<br>data size lattice ← ⊥<br>null terminated lattice← ⊥<br>string value lattice← ⊥<br>memory location lattice←stack memory<br>data origin lattice← ⊥ |

The call site analysis can also yield the following vulnerability analysis for the second argument p shown in EXAMPLE LATTICE 12:

| EXAMPLE LATTICE 12 |
|---|
| memory size lattice←range of 2 to 4<br>data size lattice←range of 2 to 4<br>null terminated lattice←null terminated<br>string value lattice← ⊥<br>memory location lattice←constant memory<br>data origin lattice←internal |

The matching actions returned from the database 314, 414 can specify rules to be applied in assessing the vulnerability lattices for the call to routine strcpy( ). In the particular case of the call to strcpy, the rules check that the first argument has a minimum memory size that is larger than or the same size as the maximum data size for the second argument. In this way, the rules (matching actions) determine whether this specific call creates a risk of buffer overflow. In this case, no overflow is possible given the effectively semantic analysis of the source code involved. The minimum memory size for argument 1 (100) is greater than or equal to the maximum data size for argument 2 (4), so the buffer cannot overflow. The data origin for argument 2 is internal, so it cannot be a vulnerability. The call is thus not marked as a vulnerability.

With regard to CODE SEGMENT 2, this is the example which had the following language-specific code: strcpy(y, z). The call site analysis for this call can yield the following vulnerability lattice for the first argument y as shown in EXAMPLE LATTICE 13:

| EXAMPLE LATTICE 13 |
|---|
| memory size lattice←100<br>data size lattice← ⊥<br>null terminated lattice← ⊥<br>string value lattice← ⊥<br>memory location lattice←static memory<br>data origin lattice← ⊥ |

The call site analysis can also yield the following vulnerability analysis for the second argument z as shown in EXAMPLE LATTICE 14:

| EXAMPLE LATTICE 14 |
|---|
| memory size lattice← ⊥<br>data size lattice← ⊥<br>null terminated lattice← ⊥<br>string value lattice← ⊥ |

-continued

EXAMPLE LATTICE 14 memory location lattice←195
data origin lattice← ⊥

The matching actions returned from the database 314, 414 can specify rules to be applied in assessing the vulnerability lattices for the call to routine strcpy( ). In the particular case of the call to strcpy, the rules check that the maximum data size for the second argument is .perp., and thus unknown. Thus, there is a possibility that the buffer can overflow.

Similarly, the data origin of the second argument is, ⊥, and thus unknown. Thus, there is a second possibility of a vulnerability. If the input is unknown or external, there is the possibility of the size being too small or the input being not of internal origin which would produce a vulnerability. In the case of the call to strcpy, the maximum data size for argument 2 is ⊥, so the buffer can overflow. The data origin for argument 2 is ⊥, so it can be a vulnerability. The call is thus marked as a vulnerability.

The embodiments described above are directed to a method of detecting buffer overflow vulnerabilities. As noted above, the method may be used to detect other vulnerabilities, such as race condition and privilege escalation.

As used herein, the term, race condition, means a pair of routine calls that happen sequentially in a program and which, if not performed atomically (i.e. without interruption by another thread or process on the machine), can become a vulnerability. A typical example is a call to determine the access rights of a file, and a subsequent call to write or read of that file based on the access. If the process is interrupted between the two calls and the file attributes are modified during the interruption, the second call may be reading the wrong information or writing to an inappropriate file.

Accordingly, CODE SEGMENT 3 represents an exemplary code segment to be analyzed to determine whether a race condition exists. This example uses access( ) and fopen( ) to illustrate a related pair of calls that could be vulnerable.

CODE SEGMENT 4

```
... some code A ...
1) r=access(filename, ... )
... some code B ...
2) if(r) then
... some code C ...
3) fopen(filename, ... )
... some code D ...
```

In CODE SEGMENT 4, there is a call to access( ) for a particular filename, followed by a test of the return value from access( ) If the test succeeds, fopen( ) is called for the same filename. Placeholders ("some code A/B/C") are listed for arbitrary code that could happen around the numbered statements. The fopen( ) call is reachable from the access( ) call, which means that there are no other operations on the file between the two calls. Thus, the fopen( ) call follows the access( ) call if the test succeeds.

While this example shows the argument to access( ) and fopen( ) as a single variable name, it is possible that the argument could be any arbitrary expression such as filename_list[i] (an entry in an array of names), or fullpath+baselen (a pointer to a character string baselen characters into fullpath). Regardless of the form of the argument, the runtime value of that argument is the same for both calls.

As in the embodiments described above for buffer overflow conditions, a lexical analyzer is used to generate an intermediate representation for the code to be analyzed for a race condition. In this embodiment, the intermediate representation includes information about declarations in the program, and records information about identifiers in the program such as their type. It can distinguish function declarations from function calls.

Figure 15:
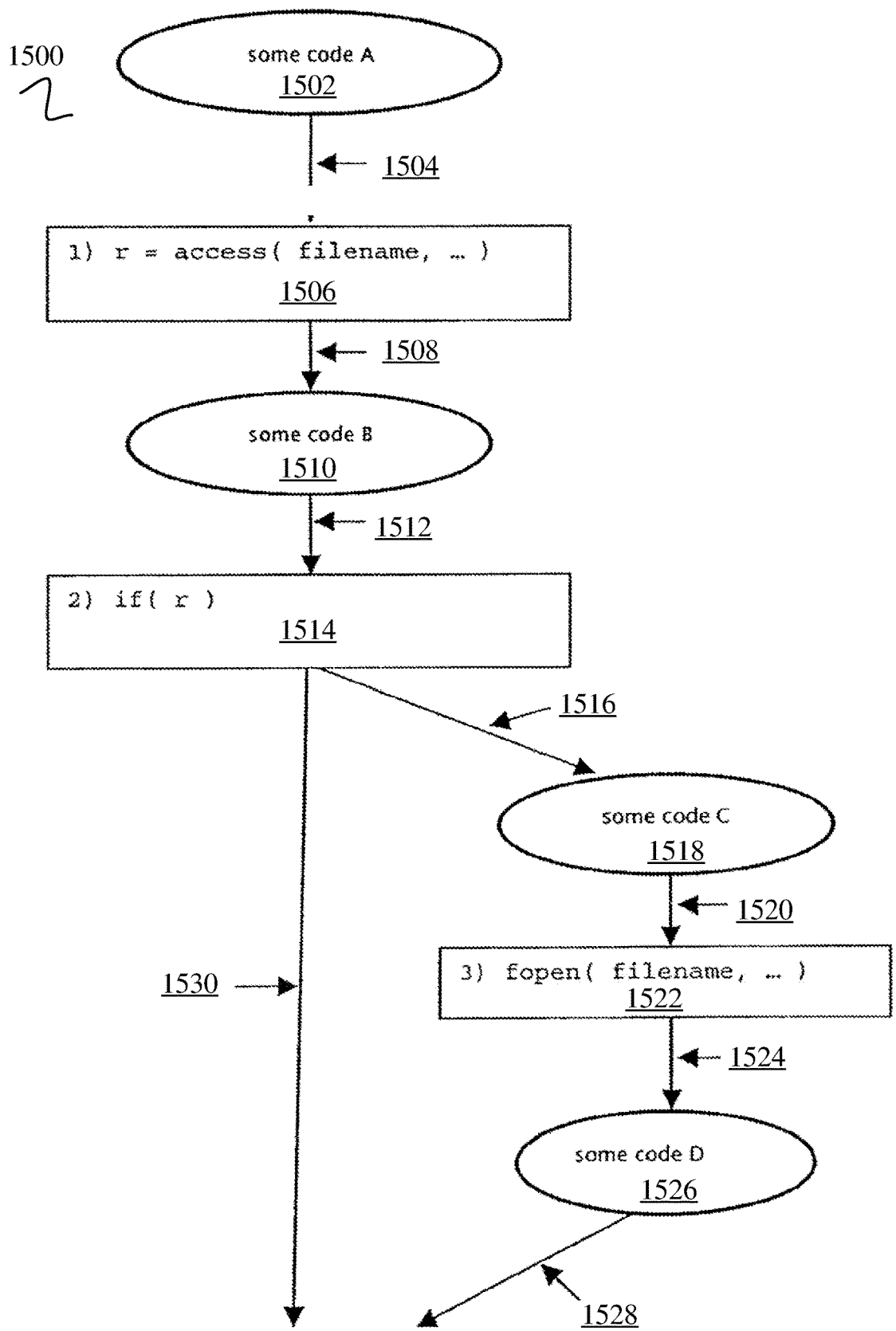
FIG. 15 is a control flow graph for testing source code changes, in accordance with some embodiments of the present disclosure.

FIG. 15 is a control flow graph 1500 of an example computer application, in accordance with embodiments of the present disclosure. The blocks 1506, 1514, and 1524 represent contiguous, straight line statements with no branching. The ovals 1502, 1510, 1518, and 1526 are regions of code with arbitrary control flow inside. The arrows 1504, 1508, 1512, 1516, 1520, 1524, 1528, and 1530 represent control flow between the blocks and code regions.

Using the control flow graph 1500, the system can traverse backward from block 1522, which contains the fopen( ) call, through the blocks preceding it. In the example shown, the backward traversal goes back to block 1506, which contains the call to access( ) Thus, the system can note that the access( ) call precedes the open( ) call. Knowing that the calls are related, the system can examine the argument list of each call, focusing on the arguments corresponding to the filename. As a heuristic, the system can compare the structure of the corresponding expressions. In this example, the system can find that both expressions are references to the same variable, and thus conclude that the two calls are referencing the same file. As a result, a race condition vulnerability can be flagged.

In another embodiment of a system for detecting race condition vulnerability, data flow analysis can be used with the system described above in order to provide information about the value of variables at different points in the program. For example, the system can determine whether the variable filename has the same value in both the access( ) call and the fopen( ) call. Data flow analysis can also be used to determine whether an argument to access( ) described as fullpath+baselen, has the same value as an argument to fopen( ) described as filename.

Privilege escalation vulnerabilities can arise when an application with a high level of system privileges can be made to perform actions outside of the intended design. This can thus allow an outside party to gain privileged access to the system that they do not otherwise possess.

The following CODE SEGMENT 5 is used for the discussion of detecting privilege escalation:

CODE SEGMENT 5

```
void somefunc( ){
    ... SetSecurityDescriptorDacl( &descriptor, TRUE,
        NULL /* ACL */, FALSE );
}
```

In this example, an API call can set security attributes for a resource. As such, the vulnerability is that a resource's ACL (access control list) is not set to null because the resource would thus be accessible or modifiable by an unauthorized user.

As in the embodiments described above, a language parser can be used to create an intermediate representation from the source code. The intermediate representation 116 can provide a symbol table that includes information for all types, constants, variables and functions declared in the file. The information for function, e.g., somefunc, can include a reference to the statements of the somefunc function. Further, statements of the intermediate representation can include control flow statements of the applicable language ("if," "while," "for," etc. in C or C++) and expressions (including assignment, function calls, arithmetic operations, etc.). Function call information includes a symbol table entry for the routine being called, and a list of expressions corresponding to the arguments.

A database of possible vulnerable calls is provided. The intermediate representation is traversed, with each function definition and statement within that definition being visited. The routine being called at function call node is matched against the database information. When there is a match, the function call is looked at in greater detail. The particular conditions which make a particular call vulnerable are previously determined.

In the example shown above, it is known that that the potential issue is that the third argument to SetSecurityDescriptonDacl( ) should not be NULL. The intermediate representation for this call can point to SetSecurityDescriptorDacl as the routine being called, and there would be four entries in the list of expressions for arguments. The first entry is the address of the variable 'descriptor', and the last three entries are the intermediate representation constants for TRUE, NULL, and FALSE.

Finding a match with SetSecurityDescriptorDacl can trigger a deeper examination of the arguments to the call. In this case, knowledge about SetSecurityDescriptorDacl's potential vulnerability can cause an examination of the third argument. The intermediate representation directly describes this as NULL, and this call site can thus be flagged as vulnerable.

As described above, embodiments of the present disclosure can analyze certain semantic characteristics of the source code itself to determine whether a vulnerability potentially exists. For example, arguments to a routine can be algorithmically analyzed in view of some known behavior about the routine (e.g., that a routine copies one argument to a buffer pointed to by another argument) to detect problematic calls. This approach can avoid false positives.

In the embodiment described above, the source code is (a) all or part of the text for an executable program written in the ANSI C language as described in the ANSI Standard X3J11, and with commonly used extensions; or (b) all or part of the text for an executable program written in the ANSI C++ language as described in the ANSI Standard X3J16. It is understood, however, that the invention may be used to analyze source code written in other languages as well.

Figure 16:
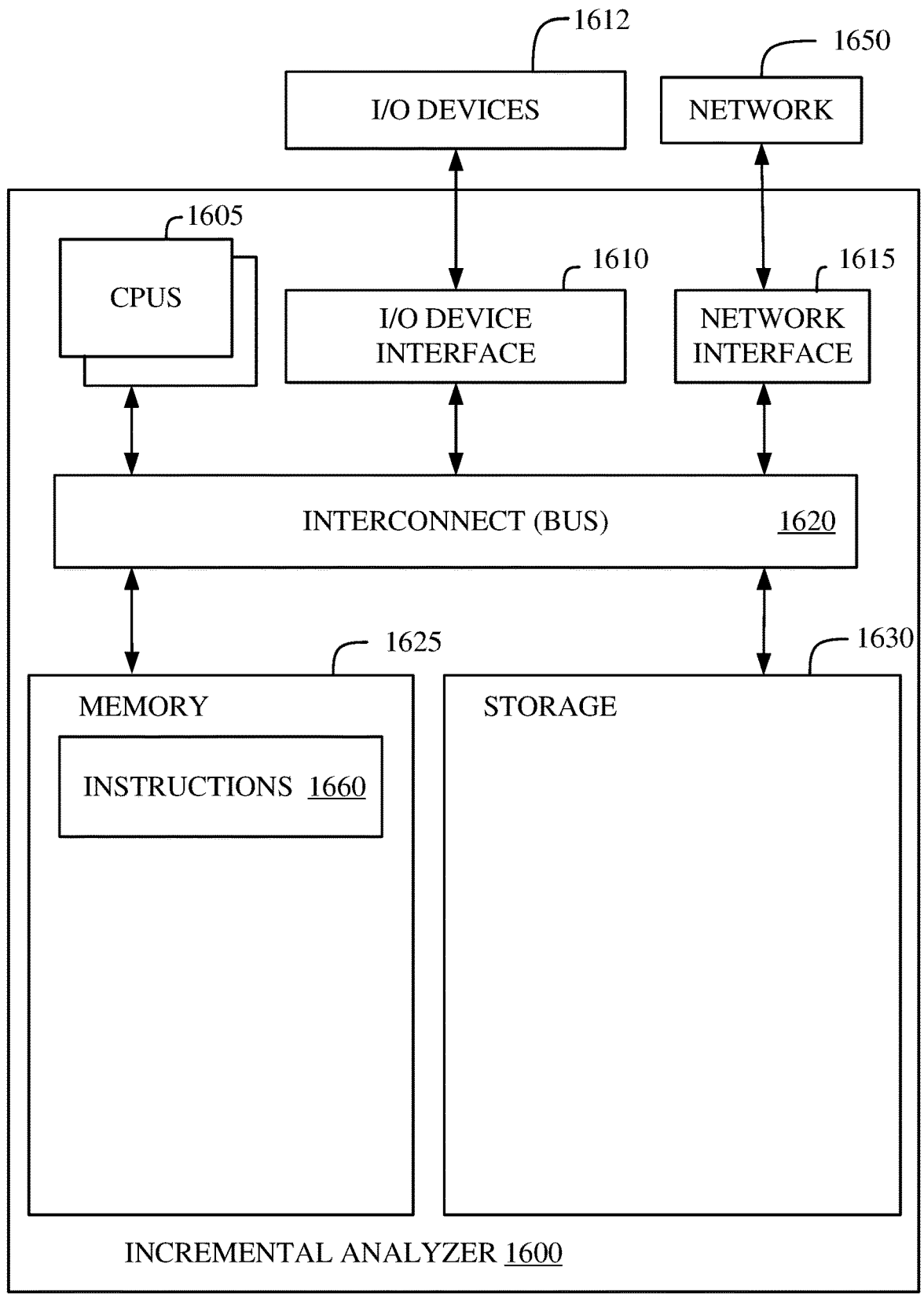
FIG. 16 is a block diagram of an example incremental analyzer, in accordance with some embodiments of the present disclosure.

Referring now to FIG. 16, illustrated is a block diagram of an example incremental analyzer 1600, in accordance with some embodiments of the present disclosure. In various embodiments, the incremental analyzer 1600 is similar to the incremental analyzer 122 and can perform the methods and/or the functionality discussed in FIGS. 1-15. In some embodiments, the incremental analyzer 1600 provides instructions for the aforementioned methods and/or functionalities to a client machine such that the client machine executes the method, or a portion of the method, based on the instructions provided by the incremental analyzer 1600. In some embodiments, the incremental analyzer 1600 comprises software executing on hardware incorporated into a plurality of devices.

The incremental analyzer 1600 includes a memory 1625, storage 1630, an interconnect (e.g., BUS) 1620, one or more CPUs 1605 (also referred to as processors 1605 herein), an I/O device interface 1610, I/O devices 1612, and a network interface 1615.

Each CPU 1605 retrieves and executes programming instructions stored in the memory 1625 or the storage 1630. The interconnect 1620 is used to move data, such as programming instructions, between the CPUs 1605, I/O device interface 1610, storage 1630, network interface 1615, and memory 1625. The interconnect 1620 can be implemented using one or more busses. The CPUs 1605 can be a single CPU, multiple CPUs, or a single CPU having multiple processing cores in various embodiments. In some embodiments, a CPU 1605 can be a digital signal processor (DSP). In some embodiments, CPU 1605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1625 is generally included to be representative of a random access memory (e.g., static random access memory (SRAM), dynamic random access memory (DRAM), or Flash). The storage 1630 is generally included to be representative of a non-volatile memory, such as a hard disk drive, solid state device (SSD), removable memory cards, optical storage, and/or flash memory devices. Additionally, the storage 1630 can include storage area-network (SAN) devices, the cloud, or other devices connected to the incremental analyzer 1600 via the I/O device interface 1610 or a network 1650 via the network interface 1615.

In some embodiments, the memory 1625 stores instructions 1660. Instructions 1660 can be processor-executable instructions for performing any portion of, or all, any of the methods and/or any of the functionality discussed in FIGS. 1-15.

In various embodiments, the I/O devices 1612 include an interface capable of presenting information and receiving input. For example, I/O devices 1612 can present information to a listener interacting with incremental analyzer 1600 and receive input from the listener.

The incremental analyzer 1600 is connected to the network 1650 via the network interface 1615. Network 1650 can comprise a physical, wireless, cellular, or different network.

In some embodiments, the incremental analyzer 1600 can be a multi-user mainframe computer system, a single-user system, or a server computer or similar device that has little or no direct user interface but receives requests from other computer systems (clients). Further, in some embodiments, the incremental analyzer 1600 can be implemented as a desktop computer, portable computer, laptop or notebook computer, tablet computer, pocket computer, telephone, smart phone, network switches or routers, or any other appropriate type of electronic device.

It is noted that FIG. 16 is intended to depict the representative major components of an exemplary incremental analyzer 1600. In some embodiments, however, individual components can have greater or lesser complexity than as represented in FIG. 16, components other than or in addition to those shown in FIG. 16 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
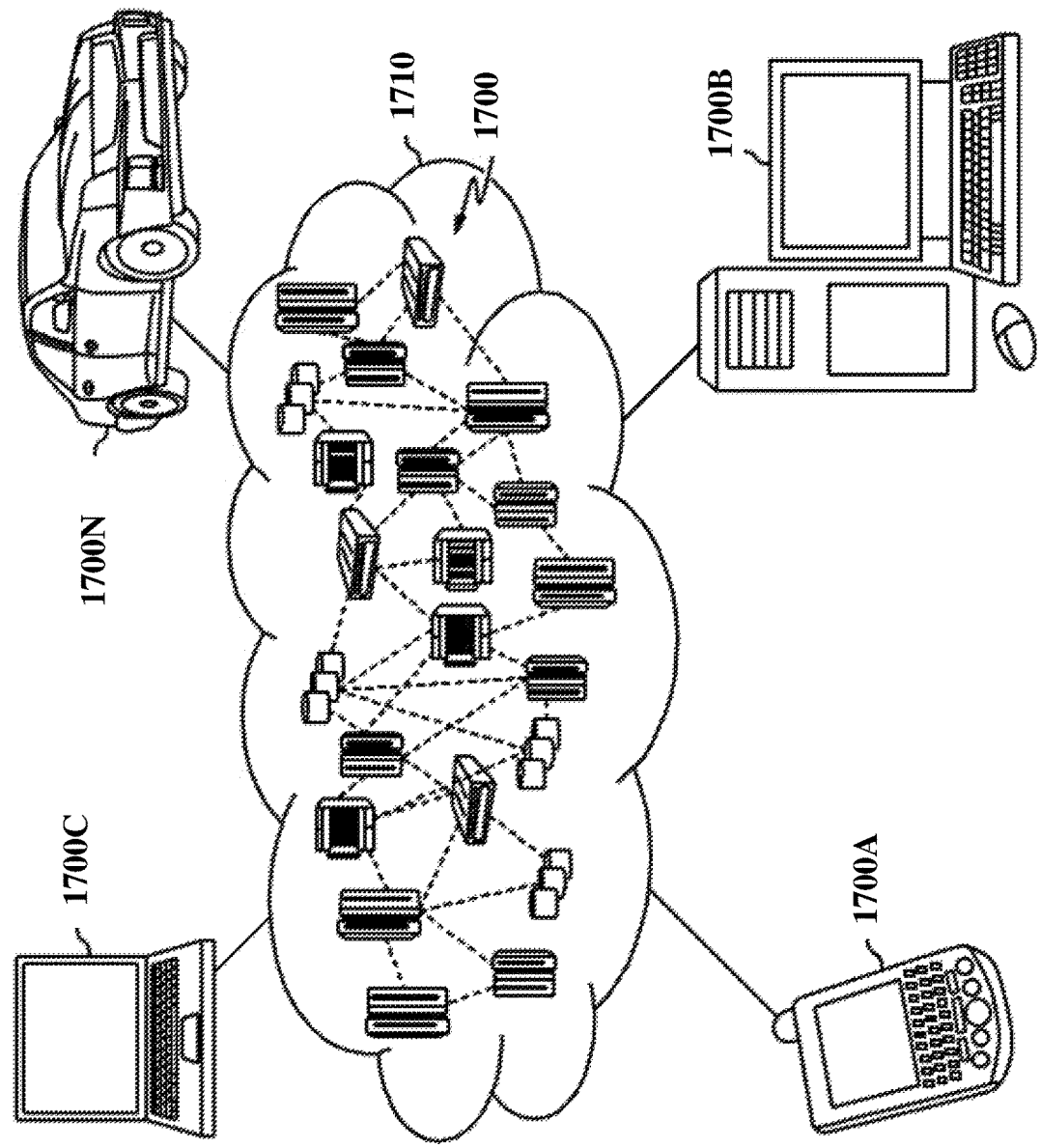
FIG. 17 depicts a cloud computing environment, according to some embodiments of the present disclosure.

Referring now to FIG. 17, which depicts a cloud computing environment 1710, according to some embodiments of the present disclosure. As shown, cloud computing environment 1710 includes one or more cloud computing nodes 1700. The cloud computing nodes 1700 can perform the methods described in FIGS. 2-4 and 12-15 and/or the functionality discussed in FIGS. 1, 5-11, and 16-18. Additionally, cloud computing nodes 1700 can communicate with local computing devices used by cloud consumers, such as, for example, personal digital assistant (PDA) or cellular telephone 1700A, desktop computer 1700B, laptop computer 1700C, and/or automobile computer system 1700N. Further, the cloud computing nodes 1700 can communicate with one another. The cloud computing nodes 1700 can also be grouped (not shown) physically or virtually, in one or more networks, such as Private, Community, Public, or Hybrid clouds as described hereinabove, or a combination thereof. This allows cloud computing environment 1710 to offer infrastructure, platforms and/or software as services for which a cloud consumer does not need to maintain resources on a local computing device. It is understood that the types of computing devices 1700A-N shown in FIG. 17 are intended to be illustrative only and that computing nodes 1700 and cloud computing environment 1710 can communicate with any type of computerized device over any type of network and/or network addressable connection (e.g., using a web browser).

Figure 18:
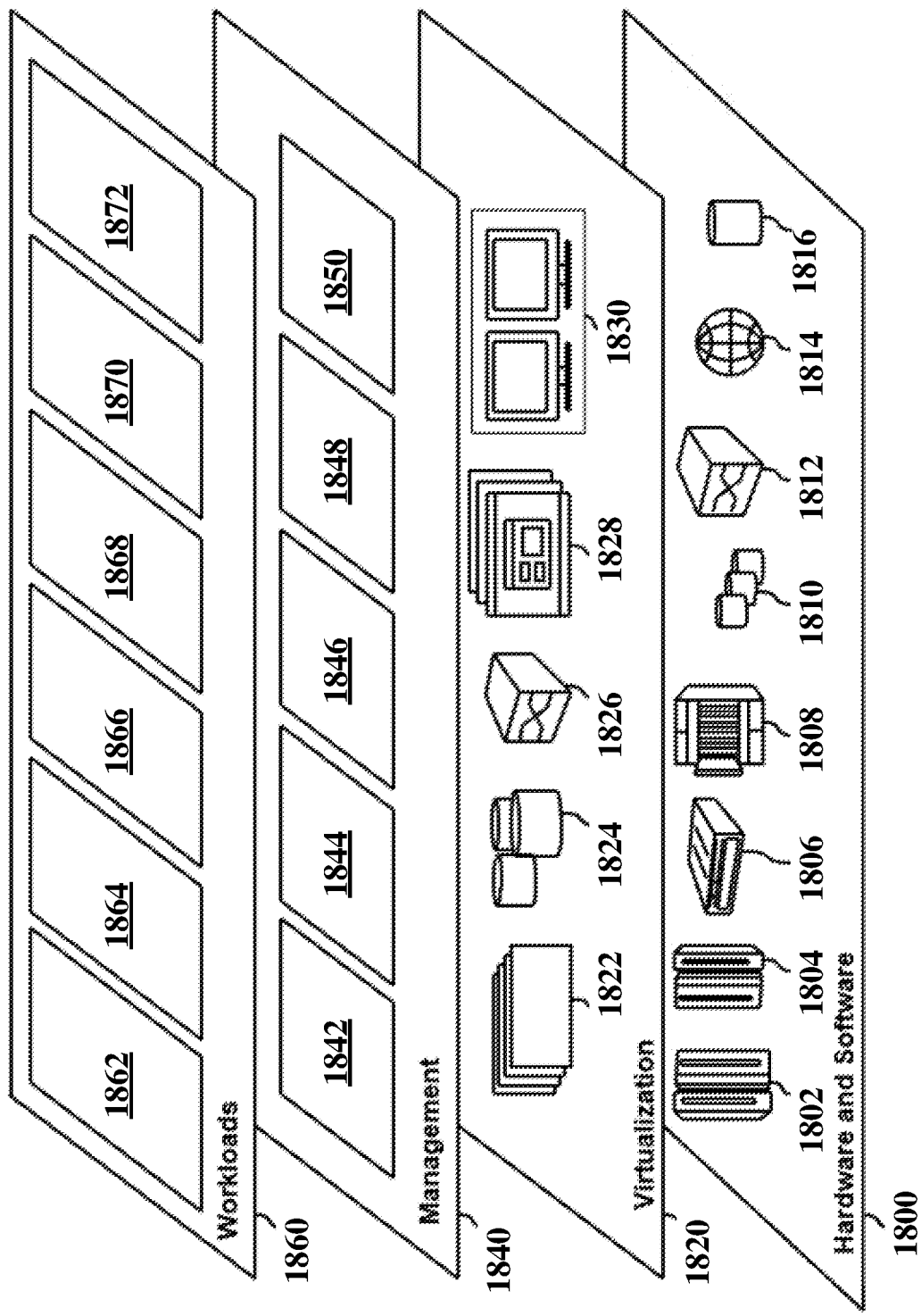
FIG. 18 depicts abstraction model layers, according to some embodiments of the present disclosure.

Referring now to FIG. 18, which depicts abstraction model layers provided by cloud computing environment 1710 (FIG. 17), according to some embodiments of the present disclosure. It should be understood in advance that the components, layers, and functions shown in FIG. 18 are intended to be illustrative only and embodiments of the disclosure are not limited thereto. As depicted below, the following layers and corresponding functions are provided.

Hardware and software layer 1800 includes hardware and software components. Examples of hardware components include: mainframes 1802; RISC (Reduced Instruction Set Computer) architecture based servers 1804; servers 1806; blade servers 1808; storage devices 1810; and networks and networking components 1812. In some embodiments, software components include network application server software 1814 and database software 1816.

Virtualization layer 1820 provides an abstraction layer from which the following examples of virtual entities can be provided: virtual servers 1822; virtual storage 1824; virtual networks 1826, including virtual private networks; virtual applications and operating systems 1828; and virtual clients 1830.

In one example, management layer 1840 can provide the functions described below. Resource provisioning 1842 provides dynamic procurement of computing resources and other resources that are utilized to perform tasks within the cloud computing environment. Metering and Pricing 1844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1846 provides access to the cloud computing environment for consumers and system administrators. Service level management 1848 provides cloud computing resource allocation and management such that required service levels are met. Service level management 1848 can allocate suitable processing power and memory to process static sensor data. Service Level Agreement (SLA) planning and fulfillment 1850 provide pre-arrangement for, and procurement of, cloud computing resources for which a future requirement is anticipated in accordance with an SLA.

Workloads layer 1860 provides examples of functionality for which the cloud computing environment can be utilized. Examples of workloads and functions which can be provided from this layer include: mapping and navigation 1862; software development and lifecycle management 1864; virtual classroom education delivery 1866; data analytics processing 1868; transaction processing 1870; and incremental analyzer 1872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for testing source code changes, comprising:
    generating an incremental intermediate representation of a security vulnerability fix to repair an identified security vulnerability of a source code application;
    generating a merged intermediate representation by merging the incremental intermediate representation with a full intermediate representation of a previous version of the source code application;
    generating an impact call-graph based on the identified security vulnerability;
    identifying, using the impact call-graph, a called function that is impacted by the security vulnerability fix, wherein the security vulnerability fix comprises a difference between the source code application and the previous version of the source code application;
    performing a static security analysis on the merged intermediate representation based on the called function to generate an incremental assessment, wherein the incremental assessment indicates whether:
        the identified security vulnerability is fixed by the security vulnerability fix; and
        a new security vulnerability is introduced by the security vulnerability fix;
    performing a flow-insensitive analysis on the merged incremental intermediate representation to generate:
        a variable model about a variable in the source code application, wherein the variable model comprises a variable lattice that represents a plurality of characteristics of the variable, and wherein generating the variable model is performed in response to a determination that the variable in the source code application is visible to a different routine of the source code application; and
        a state model comprising a state lattice that represents a plurality of states of a simulated execution of the source code application;
    performing a security vulnerability analysis on the security vulnerability fix based on the variable model and the state model; and
    generating a security assessment for the security vulnerability fix based on the security vulnerability analysis and the incremental assessment.

2. The method of claim 1, further comprising generating an impact graph based on the merged incremental intermediate representation, wherein the impact graph identifies:
    one or more changed routines comprising changes related to the security vulnerability fix; and
    one or more calling routines that call the changed routines.

3. The method of claim 2, further comprising updating the security vulnerability analysis by removing one or more findings that are not associated with the methods related to the security vulnerability fix, wherein removing the one or more findings that are not related to the impact graph comprises:
    selecting a trace from the security vulnerability analysis;
    determining the trace is not related to the impact graph; and
    removing the trace from the security vulnerability analysis.

4. The method of claim 3, further comprising removing a finding associated with the removed trace from the security vulnerability analysis.

5. The method of claim 1, wherein generating the incremental intermediate representation comprises:
    identifying one or more files for the source code application that are changed for the security vulnerability fix; and
    identifying one or more lines of source code in the source code application that are changed for the security vulnerability fix.

6. The method of claim 1, wherein performing the security vulnerability analysis comprises:
    generating a finding that the security vulnerability fix has a found security vulnerability; and
    generating a trace for the finding.

7. A computer program product comprising program instructions stored on a computer readable storage medium, wherein the computer readable storage medium is not a transitory signal per se, the program instructions executable by a processor to cause the processor to perform a method comprising:
    generating an incremental intermediate representation of a security vulnerability fix to repair an identified security vulnerability of a source code application;
    generating a merged intermediate representation by merging the incremental intermediate representation with a full intermediate representation of a previous version of the source code application;
    generating an impact call-graph based on the identified security vulnerability;
    identifying, using the impact call-graph, a called function that is impacted by the security vulnerability fix, wherein the security vulnerability fix comprises a difference between the source code application and the previous version of the source code application;

performing a static security analysis on the merged intermediate representation based on the called function to generate an incremental assessment, wherein the incremental assessment indicates whether:
   the identified security vulnerability is fixed by the security vulnerability fix; and
   a new security vulnerability is introduced by the security vulnerability fix;
performing a flow-insensitive analysis on the merged incremental intermediate representation to generate:
   a variable model about a variable in the source code application, wherein the variable model comprises a variable lattice that represents a plurality of characteristics of the variable, and wherein generating the variable model is performed in response to a determination that the variable in the source code application is visible to a different routine of the source code application; and
   a state model comprising a state lattice that represents a plurality of states of a simulated execution of the source code application;
performing a security vulnerability analysis on the security vulnerability fix based on the variable model and the state model; and
generating a security assessment for the security vulnerability fix based on the security vulnerability analysis and the incremental assessment.

8. The computer program product of claim 7, the method further comprising generating an impact graph based on the merged incremental intermediate representation, wherein the impact graph identifies:
   one or more changed routines comprising changes related to the security vulnerability fix; and
   one or more calling routines that call the changed routines.

9. The computer program product of claim 8, the method further comprising updating the security vulnerability analysis by removing one or more findings that are not associated with the methods related to the security vulnerability fix, wherein removing the one or more findings that are not related to the impact graph comprises:
   selecting a trace from the security vulnerability analysis;
   determining the trace is not related to the impact graph; and
   removing the trace from the security vulnerability analysis.

10. The computer program product of claim 9, wherein the method further comprises removing a finding associated with the removed trace from the security vulnerability analysis.

11. The computer program product of claim 7, wherein generating the incremental intermediate representation comprises:
   identifying one or more files for the source code application that are changed for the security vulnerability fix; and
   identifying one or more lines of source code in the source code application that are changed for the security vulnerability fix.

12. The computer program product of claim 7, wherein performing the security vulnerability analysis comprises:
   generating a finding that the security vulnerability fix has a found security vulnerability; and
   generating a trace for the finding.

13. A system comprising:
a computer processing circuit; and
a computer-readable storage medium storing instructions, which, when executed by the computer processing circuit, are configured to cause the computer processing circuit to perform a method comprising:
   generating an incremental intermediate representation of a security vulnerability fix to repair an identified security vulnerability of a source code application;
   generating a merged intermediate representation by merging the incremental intermediate representation with a full intermediate representation of a previous version of the source code application;
   generating an impact call-graph based on the identified security vulnerability;
   identifying, using the impact call-graph, a called function that is impacted by the security vulnerability fix, wherein the security vulnerability fix comprises a difference between the source code application and the previous version of the source code application;
   performing a static security analysis on the merged intermediate representation based on the called function to generate an incremental assessment, wherein the incremental assessment indicates whether:
      the identified security vulnerability is fixed by the security vulnerability fix; and
      a new security vulnerability is introduced by the security vulnerability fix;
   performing a flow-insensitive analysis on the merged incremental intermediate representation to generate:
      a variable model about a variable in the source code application, wherein the variable model comprises a variable lattice that represents a plurality of characteristics of the variable, and wherein generating the variable model is performed in response to a determination that the variable in the source code application is visible to a different routine of the source code application; and
      a state model comprising a state lattice that represents a plurality of states of a simulated execution of the source code application;
   performing a security vulnerability analysis on the security vulnerability fix based on the variable model and the state model; and
   generating a security assessment for the security vulnerability fix based on the security vulnerability analysis and the incremental assessment.

14. The system of claim 13, the method further comprising generating an impact graph based on the merged incremental intermediate representation, wherein the impact graph identifies:
   one or more changed routines comprising changes related to the security vulnerability fix; and
   one or more calling routines that call the changed routines.

15. The system of claim 14, the method further comprising updating the security vulnerability analysis by removing one or more findings that are not associated with the methods related to the security vulnerability fix, wherein removing the one or more findings that are not related to the impact graph comprises:
   selecting a trace from the security vulnerability analysis;
   determining the trace is not related to the impact graph; and
   removing the trace from the security vulnerability analysis.

16. The system of claim 15, wherein the method further comprises removing a finding associated with the removed trace from the security vulnerability analysis.

17. The system of claim 13, wherein generating the incremental intermediate representation comprises:
   identifying one or more files for the source code application that are changed for the security vulnerability fix; and
   identifying one or more lines of source code in the source code application that are changed for the security vulnerability fix.

18. The system of claim 13, wherein performing the security vulnerability analysis comprises:
   generating a finding that the security vulnerability fix has a found security vulnerability;
   generating a trace for the finding.

* * * * *